(12) United States Patent
Nakamura et al.

(10) Patent No.: US 10,808,673 B2
(45) Date of Patent: Oct. 20, 2020

(54) CONTROL DEVICE AND CONTROL METHOD FOR INTERNAL COMBUSTION ENGINE

(71) Applicant: Mitsubishi Electric Corporation, Tokyo (JP)

(72) Inventors: Toshifumi Nakamura, Tokyo (JP); Takahiko Inada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 16/238,149

(22) Filed: Jan. 2, 2019

(65) Prior Publication Data

US 2019/0331083 A1   Oct. 31, 2019

(30) Foreign Application Priority Data

Apr. 27, 2018   (JP) .................. 2018-086067

(51) Int. Cl.
   *F02P 17/12*    (2006.01)
   *F02D 35/02*    (2006.01)
   *G01L 23/22*    (2006.01)

(52) U.S. Cl.
   CPC ............ *F02P 17/12* (2013.01); *F02D 35/021* (2013.01); *F02D 35/027* (2013.01); *G01L 23/225* (2013.01); *F02P 2017/128* (2013.01)

(58) Field of Classification Search
   CPC .... F02D 35/021; F02P 17/12; F02P 2017/125
   USPC .................. 73/35.07, 35.08, 114.62, 114.67
   See application file for complete search history.

(56) References Cited

U.S. PATENT DOCUMENTS

| 6,275,041 | B1* | 8/2001 | Okamura | ................ F02P 17/12 |
| | | | | 324/380 |
| 6,418,785 | B1* | 7/2002 | Hatazawa | ............. F02D 35/021 |
| | | | | 73/114.08 |
| 6,526,953 | B1 | 3/2003 | Inagaki | |
| 2015/0300271 | A1* | 10/2015 | Inada | .................... F02D 41/221 |
| | | | | 123/406.12 |

(Continued)

FOREIGN PATENT DOCUMENTS

| JP | 2001-012338 A | 1/2001 |
| JP | 2003-314419 A | 11/2003 |

(Continued)

*Primary Examiner* — Eric S. McCall
(74) *Attorney, Agent, or Firm* — Sughrue Mion, PLLC; Richard C. Turner

(57) ABSTRACT

To provide a control device, of an internal combustion engine, that accurately identifies the combustion state through ion current detection in a wide operation range of the internal combustion engine, without impairing the reliability and the durability of the control device of the internal combustion engine. This internal combustion engine control device includes: an ignition plug having a center electrode and a ground electrode opposed to each other with a gap therebetween; a circulation device for short-circuiting a primary winding to cause a circulation route to enter a conduction state, thereby stopping spark discharge; and an ion-current-detection bias voltage control device for controlling bias voltage for ion current detection. The potential of the center electrode in an ion current detection period is controlled by adjusting the value of the bias voltage and the changing speed of the bias voltage.

19 Claims, 14 Drawing Sheets

(56) References Cited

U.S. PATENT DOCUMENTS

2019/0113017 A1* 4/2019 Nakamura .............. F02P 3/053

FOREIGN PATENT DOCUMENTS

| JP | 2006-077762 A | 3/2006 |
| JP | 2007-032352 A | 2/2007 |
| JP | 2009-275625 A | 11/2009 |

* cited by examiner

CONTROL DEVICE AND CONTROL METHOD FOR INTERNAL COMBUSTION ENGINE

BACKGROUND OF THE INVENTION

1. Field of the Invention

The present disclosure relates to the field of a control device of an internal combustion engine (hereinafter, also referred to as internal combustion engine control device), the control device performing control of the internal combustion engine by detecting ion current.

2. Description of the Background Art

In operation of an internal combustion engine, in association with combustion in a combustion chamber of the internal combustion engine, molecules of mixed gas in the combustion chamber are ionized, and when voltage is applied through an ignition plug into the combustion chamber in the ionized state, fine current (hereinafter, referred to as ion current) is generated. In a spark-ignition-type internal combustion engine, if ion current generated in the combustion chamber is detected after ignition is performed by use of an ignition plug, then, on the basis of the magnitude of detected ion current, the time period in which the ion current is being generated, and the like, the operation state of the internal combustion engine, such as knocking, preignition, and combustion limit, can be detected. Adjusting the ignition time or correcting the fuel injection amount on the basis of the detection result is conventionally known (for example, see Patent Document 1).

However, in a case where an ignition plug is used as an ion current detection probe as in Patent Document 1, during a period when spark discharge is occurring at the ignition plug in the ignition device, the combustion state cannot be detected by using ion current, because of the current of spark discharge.

Further, in a case where the combustion speed in a cylinder is high, such as when the operation condition of the internal combustion engine is set to high rotation and high load, the period from the ignition time point to the end of ion generation due to combustion is short. Thus, much of the period of ion generation due to combustion is hidden in the spark discharge period, which makes it difficult to detect the combustion state on the basis of ion current information (see Patent Document 2).

In contrast, a current-interruption-type ignition device has been disclosed in which spark discharge of an ignition device is forcibly interrupted in the middle of discharge by, for example, short-circuiting a primary winding of the ignition device, whereby the spark discharge time period is adjusted to be short in accordance with an operation condition (for example, see Patent Document 3 and Patent Document 4).

Further, Patent Document 5 indicates that, by combining a device which interrupts spark discharge in the middle of discharge as described above and a conventional ion current detection device, it is possible to detect ion current which is hidden in spark discharge in ordinary ignition.

Patent Document 1: Japanese Laid-Open Patent Publication No. 2009-275625
Patent Document 2: Japanese Laid-Open Patent Publication No. 2006-77762
Patent Document 3: Japanese Laid-Open Patent Publication No. 2001-12338
Patent Document 4: Japanese Laid-Open Patent Publication No. 2003-314419
Patent Document 5: Japanese Laid-Open Patent Publication No. 2007-32352

For example, in an ignition device using a discharge stopping device which interrupts discharge in the middle of spark discharge according to Patent Document 3, a thyristor, which is for controlling ignition energy and which is oriented in the direction in which voltage induced in the primary winding of the ignition coil at the time of ignition operation is applied in the forward direction between the anode and the cathode, is connected in parallel to the primary winding of the ignition coil. After primary winding current of the ignition coil is interrupted at ignition time, the thyristor is caused to enter an ON-state at an appropriate timing to short-circuit the primary winding of the ignition coil, whereby ignition output is attenuated and spark discharge is stopped.

In such a discharge stopping device, current is caused to flow in the primary winding of the ignition coil, a magnetic field that corresponds to a magnetic flux remaining in the iron core of the ignition coil is caused to occur, thereby stopping discharge, and then, current in the primary winding is gradually reduced. Accordingly, without causing re-discharge, the discharge stopping process is ended before the next ignition cycle of the internal combustion engine starts.

In this device, in a period in which circulation current is generated in the primary winding by short-circuiting the primary winding, the magnetic flux is gradually reduced due to consumption of the magnetic flux, and in association therewith, the circulation current is also gradually reduced. Due to the change in the magnetic flux, voltage having the same polarity as high ignition voltage is generated at the secondary winding side, and is applied to the ignition plug. As seen from the fact that the spark discharge at the ignition plug is stopped, this voltage is not as high as the voltage that keeps discharge (hereinafter, discharge keeping voltage), but voltage of about several hundred V is generated during the discharge stop.

As for ignition coils, those in which high ignition voltage to be applied to an ignition plug is negative voltage are increasingly used. In such a negative-voltage-ignition-type ignition coil, negative bias voltage of about several hundred V is generated in the ignition plug during discharge stop.

In order to detect ion current, if an ignition plug center electrode which is used as an ion current detection probe has a positive potential, the ion current detection amount becomes large, which is advantageous. Therefore, in order to detect ion current during discharge stop, the level of the positive bias voltage for detecting ion current (hereinafter, ion-current-detection bias voltage) is raised to a level at which the ion-current-detection bias voltage exceeds the negative bias voltage of several hundred V generated during discharge stop, and at which the ignition plug center electrode potential can be made a positive potential.

FIG. 12 shows a timing chart of a conventional ignition device having a discharge stopping device and an ion current detection device as described above. When a power supply signal, S1 signal, of an ignition device is set to Hi and an ignition switch signal S2 is set to Hi at t1, a primary winding current I1 of an ignition coil increases. When the S2 signal is set to Low and the primary winding current is interrupted at t2, ignition discharge is caused and ignition is realized. While discharge is occurring, a secondary winding current I2 flows. For re-driving the ignition switch, when the S2 signal is set to Hi at t3, the primary winding current I1 flows. However, since the primary winding is disconnected from the power supply for ignition, the primary winding current I1 decreases (magnetic flux consumption) from t4, at which the primary winding current I1 is at the peak. As described above, for ion current detection, a center electrode potential Vp is increased from t4, that is, the bias voltage is increased. Thus, as shown in the drawing, ion-current-detection bias voltage from a time point t5, at which the magnetic flux consumption due to the discharge stopping operation ends, remains at a higher level than necessary. Thus, in a case where high voltage is always applied, a higher insulating performance of an ion current detection circuit could be demanded, or due to a higher risk of occurrence of corona discharge, corona deterioration of the ignition device could be started earlier. This could lead to impaired reliability and durability of the ignition device.

When the ion-current-detection bias voltage is always in a high voltage state, loss of ignition energy in a discharge route in an ignition cycle in which discharge stop is not performed is increased. Thus, ignition energy that can be put in the ignition plug gap decreases. Then, in an ignition cycle that needs much ignition energy for such combustion as in a low-rotation and low-load state and at the time of engine start, misfire due to shortage of ignition energy could occur. Therefore, preferably, as for the ion-current-detection bias voltage, the center electrode potential is raised high by only a necessary amount and only for the period in which discharge stopping operation is performed in the ignition cycle.

The present disclosure has been made to solve the above problem. An object of the present disclosure is to provide a highly reliable internal combustion engine control device that can accurately perform ion current detection in an internal combustion engine.

An internal combustion engine control device according to one aspect of the present disclosure includes: an ignition plug having a first electrode and a second electrode which are opposed to each other with a gap therebetween, the ignition plug being for igniting a combustible air-fuel mixture in a combustion chamber; an ignition device including a primary winding supplied with current from a power supply device and a secondary winding magnetically coupled to the primary winding, the ignition device being for supplying ignition energy to the ignition plug; an ion current detection device having an ion current detection circuit and an ion-current-detection bias voltage control device, the ion current detection circuit being for detecting, as ion current, ion generated in the combustion chamber as a result of the combustible air-fuel mixture being combusted due to spark discharge caused by the ignition energy, the ion-current-detection bias voltage control device being for controlling bias voltage for ion current detection; and a circulation device for short-circuiting the primary winding to cause a circulation route to enter a conduction state, thereby stopping the spark discharge. The ion-current-detection bias voltage control device performs control such that: the bias voltage is increased such that a potential of the first electrode becomes a positive voltage during a period in which the spark discharge is stopped by the circulation device and ion current is detected; and the bias voltage is decreased at an end of the period in which the spark discharge is stopped by the circulation device.

A method for controlling an internal combustion engine according to one aspect of the present disclosure is a method for controlling an internal combustion engine including: an ignition plug having a first electrode and a second electrode which are opposed to each other with a gap therebetween, the ignition plug being for igniting a combustible air-fuel mixture in a combustion chamber; an ignition device including a primary winding supplied with current from a power supply device and a secondary winding magnetically coupled to the primary winding, the ignition device being for supplying ignition energy to the ignition plug; an ion current detection device having an ion current detection circuit and an ion-current-detection bias voltage control device, the ion current detection circuit being for detecting, as ion current, ion generated in the combustion chamber as a result of the combustible air-fuel mixture being combusted due to spark discharge caused by the ignition energy, the ion-current-detection bias voltage control device being for controlling bias voltage for ion current detection; and a circulation device for short-circuiting the primary winding to cause a circulation route to enter a conduction state, thereby stopping the spark discharge. The method includes the steps of: supplying ignition energy to the ignition plug to cause spark discharge; stopping the spark discharge by the circulation device and detecting ion current; and determining a combustion state on the basis of the detected ion current, and controlling the combustion state. In the step of detecting the ion current, control is performed such that: the bias voltage is increased by the ion-current-detection bias voltage control device such that a potential of the first electrode becomes a positive voltage; and the bias voltage is decreased by the ion-current-detection bias voltage control device at an end of a period in which the spark discharge is stopped by the circulation device.

According to the configurations described above, in accordance with the level of negative bias voltage generated due to a change in the magnetic flux during discharge stop in an ignition cycle, the ion-current-detection bias voltage can be set to an optimum voltage level so as to correspond to each timing in the ignition cycle. Accordingly, ion current detection can be accurately performed, and a highly reliable internal combustion engine control device can be provided.

DETAILED DESCRIPTION OF THE PREFERRED EMBODIMENTS OF THE INVENTION

Figure 1:
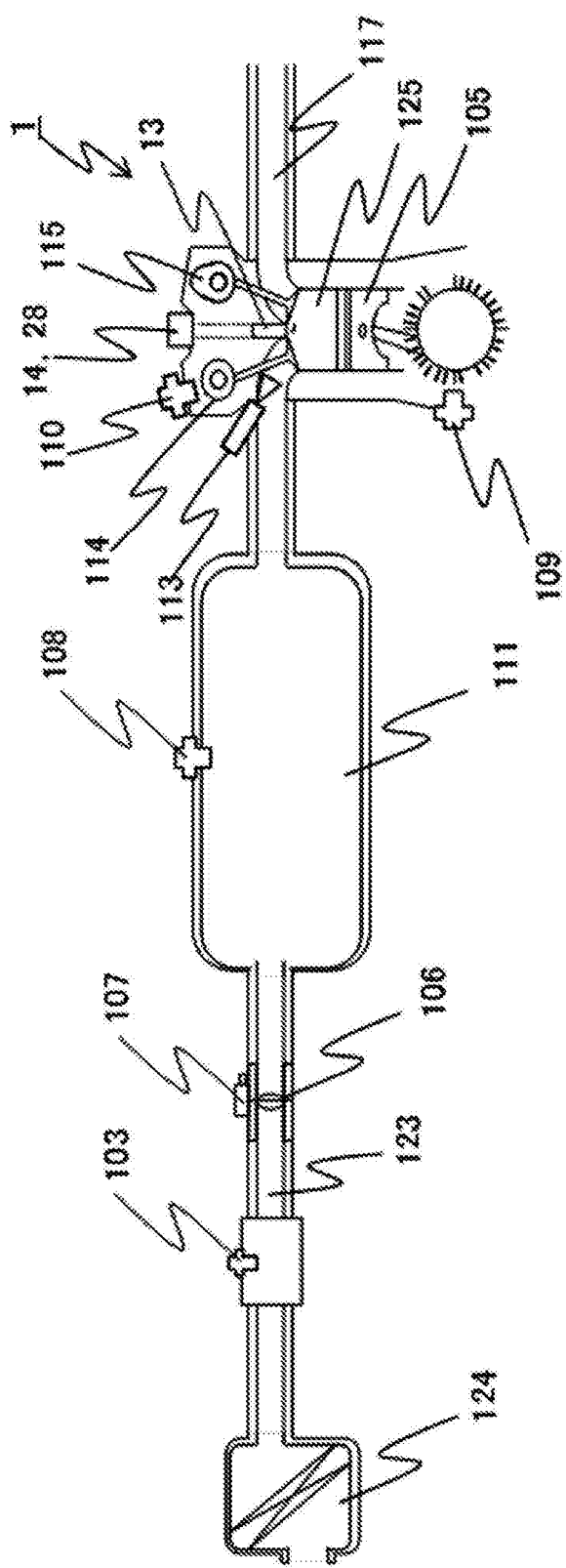
FIG. 1 is a schematic configuration diagram of an internal combustion engine according to the first embodiment of the present disclosure.

Hereinafter, embodiments will be described with reference to the drawings. In the drawings, the same reference characters denote the same or corresponding parts.

First Embodiment

Figure 2:
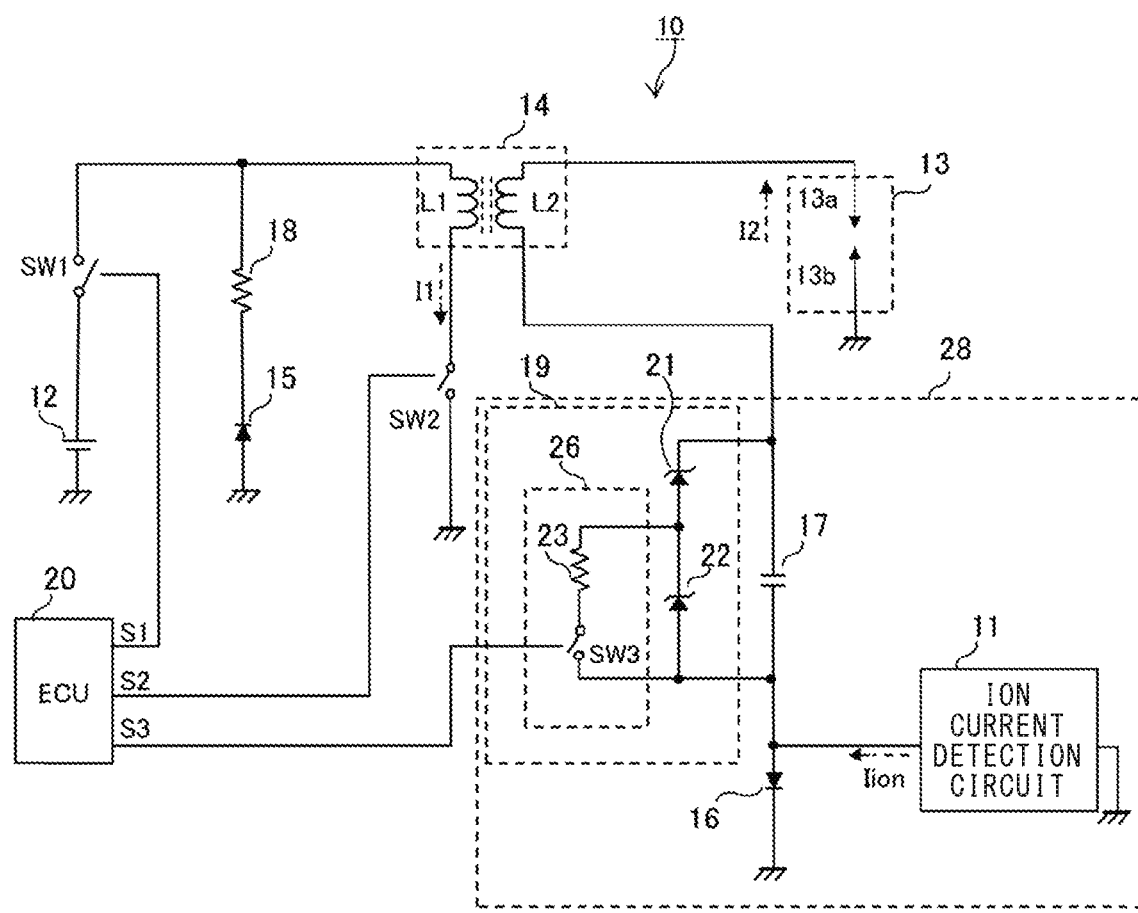
FIG. 2 is an electric circuit diagram showing a basic configuration of a control device of the internal combustion engine including an ion current detection device according to the first embodiment.

A control device 10 of an internal combustion engine 1 including an ion current detection device (hereinafter, simply referred to as control device 10) according to the first embodiment is described with reference to the drawings. FIG. 1 is a schematic configuration diagram of the internal combustion engine 1 according to the present embodiment of the present disclosure. FIG. 2 is an electric circuit diagram showing a basic configuration of the control device 10. In FIGS. 1 and 2, for convenience, an example is shown in which one combustion chamber 125 is provided, but the internal combustion engine 1 according to the present embodiment may be an internal combustion engine having a plurality of cylinders, that is, may include a plurality of combustion chambers 125 and pistons 105. In that case, control devices 10 having similar basic configurations may be provided by the number of cylinders, or some components such as an ion current detection circuit may be shared by the plurality of cylinders. The internal combustion engine 1 and the control device 10 are mounted in a vehicle, and the internal combustion engine 1 serves as a drive force source for the vehicle (wheels).

[Configuration of Internal Combustion Engine 1]

First, a configuration of the internal combustion engine 1 is described. The internal combustion engine 1 has a combustion chamber 125 (in a case where there are a plurality of combustion chambers, four combustion chambers 125 are provided, for example) in which a mixture of air and fuel (combustible air-fuel mixture) is combusted. The combustion chamber 125 is composed of a cylinder and a piston 105. In the following, the combustion chamber 125 is also referred to as a cylinder. The internal combustion engine 1 includes: an intake path 123 for supplying air to each combustion chamber 125; and an exhaust path 117 for discharging exhaust gas produced as a result of combustion performed in each combustion chamber 125. The internal combustion engine 1 includes a throttle valve 106 for opening and closing the intake path 123. The throttle valve 106 is an electronic-control-type throttle valve which is driven to be opened and closed by an electric motor controlled by an electronic control device (hereinafter, ECU: electronic control unit) 20. The throttle valve 106 is provided with a throttle opening degree sensor 107 for outputting an electric signal according to the opening degree of the throttle valve 106.

An air cleaner 124 for cleaning air that is taken into the intake path 123 is provided in a most upstream portion of the intake path 123. An air flow sensor 103 for outputting an electric signal according to the flow rate of the intake air that is taken into the intake path 123 is provided to the intake path 123 at the upstream side of the throttle valve 106. A portion of the intake path 123 at the downstream side of the throttle valve 106 is an intake manifold 111, and is coupled to a plurality of combustion chambers 125. A portion at the upstream side of the intake manifold 111 is a surge tank for suppressing intake pulsation.

The intake manifold 111 is provided with a manifold pressure sensor 108 for outputting an electric signal according to a manifold pressure, which is the pressure of the gas in the intake manifold 111. Only either one of the air flow sensor 103 and the manifold pressure sensor 108 may be provided. An intake port which is a portion at the downstream side of the intake manifold 111 is provided with an injector 113 for injecting fuel. The injector 113 may be provided so as to directly inject fuel into each combustion chamber 125.

An ignition plug 13 for igniting an air-fuel mixture composed of air and fuel in the combustion chamber 125 and an ignition coil 14 for supplying ignition energy to the ignition plug 13 are provided in a top portion of each combustion chamber 125. An intake valve 114 for adjusting the amount of intake air, which is taken into the combustion chamber 125 from the intake path 123, and an exhaust valve 115 for adjusting the amount of exhaust gas, which is discharged from the combustion chamber 125 to the exhaust path 117, are provided in the top portion of each combustion chamber 125. The intake valve 114 is provided with an intake variable valve timing mechanism for varying the valve opening/closing timing therefor. The exhaust valve 115 is provided with an exhaust variable valve timing mechanism for varying the valve opening/closing timing therefor. The intake and exhaust variable valve timing mechanisms 114 and 115 each have an electric actuator that changes the phase angle at an opening/closing timing of the valve. The electric actuator is an electric motor that changes the phase angle.

A crank shaft of the internal combustion engine 1 is provided with a signal plate having an outer periphery on which a plurality of teeth are provided at predetermined angle intervals. A crank angle sensor 109 is fixed to a cylinder block so as to be opposed to the teeth on the signal plate of the crank shaft, and outputs a pulse signal synchronized with passage of the teeth. Although not shown, a cam shaft of the internal combustion engine 1 is provided with a signal plate having an outer periphery on which a plurality of teeth are provided at predetermined angle intervals. A cam angle sensor 110 is fixed so as to be opposed to the teeth on the signal plate of the cam shaft, and outputs a pulse signal synchronized with passage of the teeth. On the basis of the two kinds of output signals from the crank angle sensor 109 and the cam angle sensor 110, the ECU 20 detects the crank angle using the top dead center of each piston 105 as a reference and determines the stroke of each combustion chamber 125.

<Ion Current Detection Device 28, Ignition Coil 14, Ignition Plug 13>

The ion current detection device 28 which outputs an output signal according to current that flows between the electrodes (center electrode 13a, ground electrode 13b) of each ignition plug 13 is provided. Each of the plurality of combustion chambers 125 may be provided with one ion current detection device 28, one ignition coil 14, and one ignition plug 13.

FIG. 2 shows an electric circuit diagram showing the entirety of the control device 10 which includes the ion current detection device 28, the ignition coil 14, the ignition plug 13, and the ECU 20 which are provided in one combustion chamber 125. In the drawing, the ignition plug 13 is provided at the cylinder of the internal combustion engine, has a first electrode (hereinafter, center electrode) 13a and a second electrode (hereinafter, ground electrode) 13b forming a gap between the ground electrode 13b and the center electrode 13a, and ignites the combustible air-fuel mixture in the combustion chamber 125 to cause spark discharge. The ignition coil 14 includes: a primary winding L1 supplied with constant voltage from a power supply device 12 through a first switch SW1; and a secondary winding L2 which is magnetically coupled to the primary winding L1 and which generates high voltage to be supplied to the ignition plug. At one end of the primary winding L1, a diode 15 connected in parallel to the power supply device 12 is provided, and the diode 15 forms a part of a circulation device which short-circuits both ends of the primary winding L1. A resistance element 18 indicates the resistance value of a circulation route. A second switch SW2 for ignition control is connected in series to the other end of the primary winding L1, and the second switch SW2 forms a part of the circulation device.

The ion current detection device 28 is connected to the low voltage side of the secondary winding L2. The ion current detection device 28 includes: a back flow prevention diode 16 connected to the secondary winding L2; a capacitor 17 which is connected between the secondary winding L2 and the back flow prevention diode 16 and which generates bias voltage Vbias for ion current detection; an ion-current-detection bias voltage control device 19 connected in parallel to the capacitor 17; and an ion current detection circuit which amplifies voltage according to ion current and outputs the resultant voltage as an output signal. Here, as the first switch SW1, the second switch SW2, and the third switch SW3, switching means composed of any semiconductor element such as a MOSFET (metal oxide semiconductor field effect transistor), an IGBT (insulated gate bipolar transistor), or a transistor may be used.

In the ion-current-detection bias voltage control device 19, a first Zener diode 21 and a second Zener diode 22, which are for clamping at a constant value the voltage of the capacitor 17 storing the bias voltage Vbias for ion current detection, are connected, and a short circuit 26 is connected in parallel to the second Zener diode 22. In the short circuit 26, a resistance element 23 and the third switch SW3 are connected in series to each other, and the short circuit 26 is configured to short-circuit both ends of the second Zener diode 22 in accordance with a command of an S3 signal described later (see t15 in FIG. 6; bias voltage Vbias is switched to a lower voltage). The resistance element 23 protects the switching element forming the third switch SW3 by restricting the amount of current flowing in the short circuit 26, and, specifically, may be set to have a resistance value of not less than 20Ω.

Figure 3:
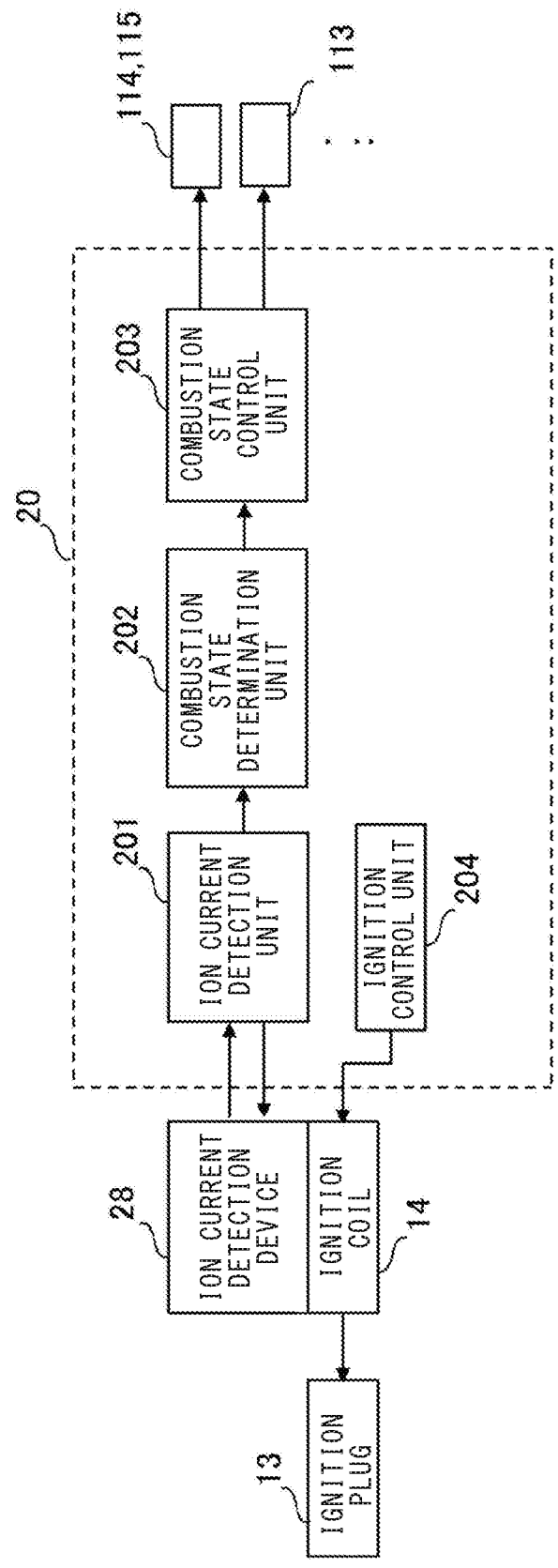
FIG. 3 is a functional block diagram of the control device of the internal combustion engine including the ion current detection device according to the first embodiment.
Figure 4:
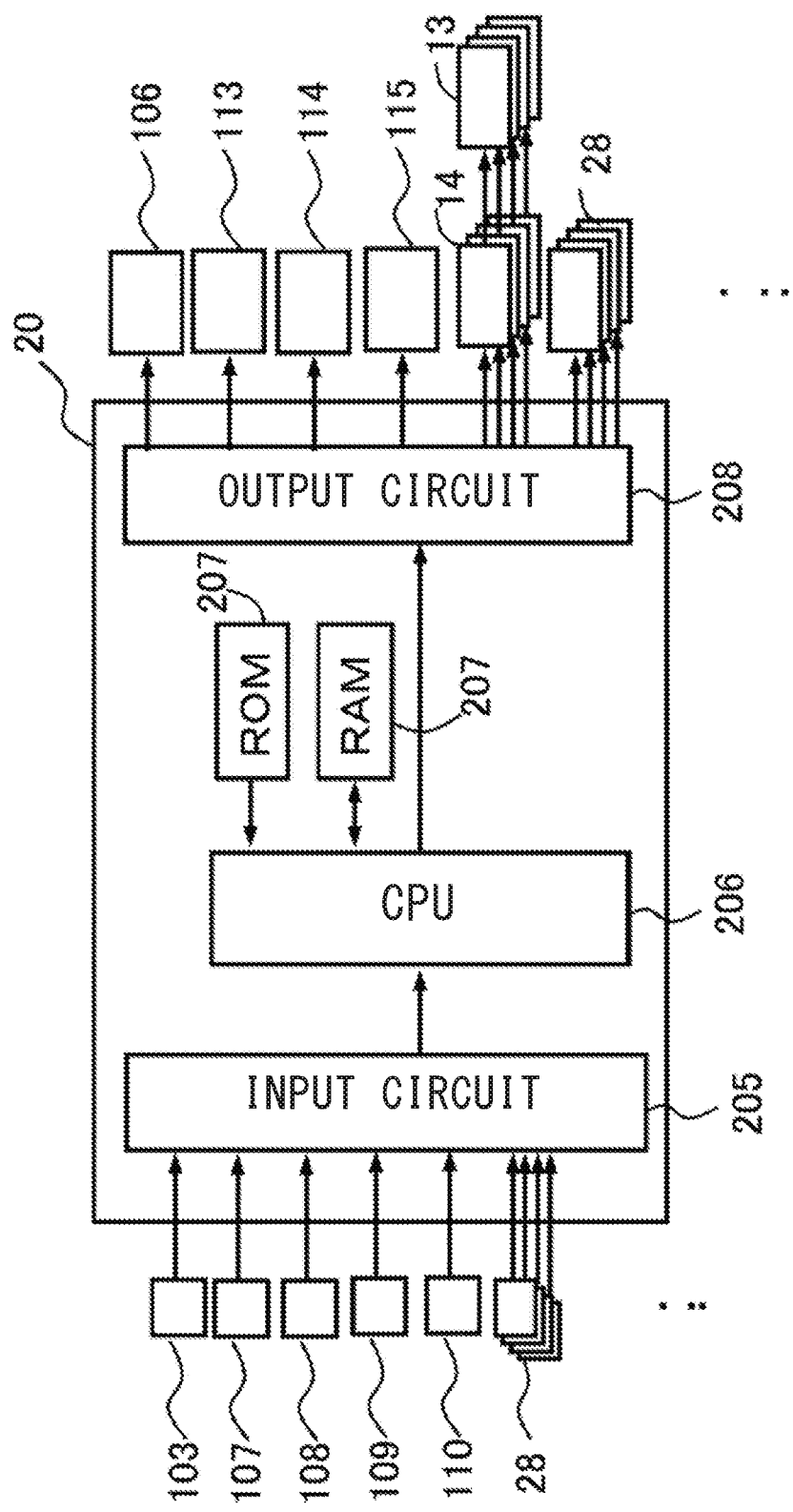
FIG. 4 is a hardware configuration diagram of an electronic control device (ECU) in the internal combustion engine according to the first embodiment.

FIG. 3 is a functional block diagram of the control device 10 of the internal combustion engine 1 according to the first embodiment. FIG. 4 is a hardware configuration diagram of the ECU 20.

[Configuration of ECU 20]

In FIG. 3, the ECU 20 includes control units such as an ion current detection unit 201, a combustion state determination unit 202, a combustion state control unit 203, and an ignition control unit 204. The control units 201 to 204, etc. of the ECU 20 are each realized by processing circuitry included in the ECU 20. Specifically, as shown in FIG. 4, the ECU 20 includes, as the processing circuitry, the following: a calculation processing device 206 (computer) such as a CPU (central processing unit); a storage device 207 for communicating data with the calculation processing device 206; an input circuit 205 for inputting external signals to the calculation processing device 206; an output circuit 208 for outputting signals to the outside from the calculation processing device 206; and the like, and these are connected by a bus.

As the calculation processing device 206, an ASIC (application specific integrated circuit), an IC (integrated circuit), a DSP (digital signal processor), an FPGA (field programmable gate array), various kinds of logical circuits, and various kinds of signal processing circuits, and the like may be provided. As the calculation processing device 206, a plurality of calculation processing devices of the same kind or of different kinds may be provided, and the processes may be shared by the calculation processing devices. As the storage device 207, a RAM (random access memory) configured to be able to read and write data with respect to the calculation processing device 206, a ROM (read only memory) configured to be able to read data from the calculation processing device 206, and the like are provided. The input circuit 205 has various kinds of sensors, switches, and the like connected thereto, and includes an A/D converter and the like for inputting output signals of these sensors, switches, and the like to the calculation processing device 206. The output circuit 208 has electric loads connected thereto, and includes a drive circuit and the like for outputting control signals from the calculation processing device 206 to the electric loads.

The functions of the control units 201 to 204, etc. included in the ECU 20 are realized by the calculation processing device 206 executing software (program) stored in the storage device 207 such as a ROM, and by the calculation processing device 206 cooperating with other hardware of the ECU 20 such as the storage device 207, the input circuit 205, and the output circuit 208. Maps that are used by the control units 201 to 204 and settings data such as determination values are stored, as a part of software (program), in the storage device 207 such as a ROM.

In the present embodiment, the input circuit 205 has connected thereto the air flow sensor 103, the throttle opening degree sensor 107, the manifold pressure sensor 108, the crank angle sensor 109, the cam angle sensor 110, and the plurality (four in the present example) of ion current detection devices 28 for the respective combustion chambers 125. The output circuit 208 has connected thereto the throttle valve 106 (electric motor), the injector 113, the intake variable valve timing mechanism 114, the exhaust variable valve timing mechanism 115, the plurality (four in the present example) of ignition coils 14 for the respective combustion chambers 125, the ion current detection devices 28, and the like. The ECU 20 has connected thereto various kinds of sensors, switches, actuators, and the like (not shown). Although the plurality of (four in the present example) ignition coils 14 for the respective combustion chambers 125, the plurality of ion current detection devices 28, and the like have been shown, only one of each of the ignition coil 14, the ion current detection device 28, and the like may be provided so as to be commonly used.

As basic control, the ECU 20 calculates the fuel injection amount, the ignition time, and the like on the basis of inputted output signals and the like of various kinds of sensors, and performs drive control of the injector 113, the ignition coil 14, and the like. The ECU 20 outputs, as control signals for the ignition coil 14, a first command signal (hereinafter, S1 signal) and a second command signal (hereinafter, S2 signal), which are ON/OFF signals for the first switch SW1 serving as a power supply switch and the second switch SW2 for ignition control, respectively. Further, as described above, since the internal combustion engine 1 includes the ion current detection device 28, the ECU 20 also outputs a third command signal (hereinafter, S3 signal) for controlling the ion-current-detection bias voltage control device 19.

[Ignition Operation]

In order to generate high voltage in the secondary winding L2 thereby causing spark discharge between the first electrode (hereinafter, center electrode) 13a and the second electrode (hereinafter, ground electrode) 13b of the ignition plug 13, the ignition control unit 204 performs an ignition control process in which the primary winding L1 is energized by the power supply device 12 and then current is interrupted.

Specifically, the S1 signal to the first switch SW1, which is an energization switch, is switched from a Low level to a Hi level, and then the S2 signal to the second switch SW2 is switched from a Low level to a Hi level. Accordingly, energization to the primary winding L1 of the ignition coil 14 is started. After energization for spark discharge has been sufficiently performed, the S2 signal for the second switch SW2 is switched from the Hi level to the Low level, whereby high ignition voltage is generated in the secondary winding L2 of the ignition coil 14. The high ignition voltage is applied to the ignition plug 13, whereby spark discharge occurs between the center electrode 13a and the ground electrode 13b. The ignition control unit 204 calculates an energization time period for the primary winding L1 and an ignition time (ignition crank angle).

[Operation of Ion Current Detection]

Next, when the S1 signal is switched to the Low level to turn off the first switch SW1, and the second switch SW2 for which the S2 signal is at the Hi level is turned on, both ends of the primary winding L1 of the ignition coil 14 are short-circuited by the diode 15, and a closed circuit (circulation route) is formed by the primary winding L1 and the diode 15. At this time, the primary winding current I1 which flows in the primary winding L1 due to the diode 15 is allowed to flow only in the same direction as the direction in which current flows during the energization for the spark discharge.

When spark discharge stops, a potential Vp of the center electrode is raised by the bias voltage Vbias for ion current detection, and becomes a positive potential, whereby ion current detection is started. The circulation period of the primary winding L1 and the bias voltage Vbias are calculated by the ion current detection unit 201.

In the present embodiment, the circulation device is composed of: the diode 15; the resistance element 18 which indicates the resistance value of the circulation route; and the second switch SW2 for ignition control. However, any means can be employed as long as the primary winding L1 can be short-circuited. For example, a configuration may be employed in which the primary winding L1 is short-circuited by use of a desired switching element such as a thyristor or a transistor.

Figure 5:
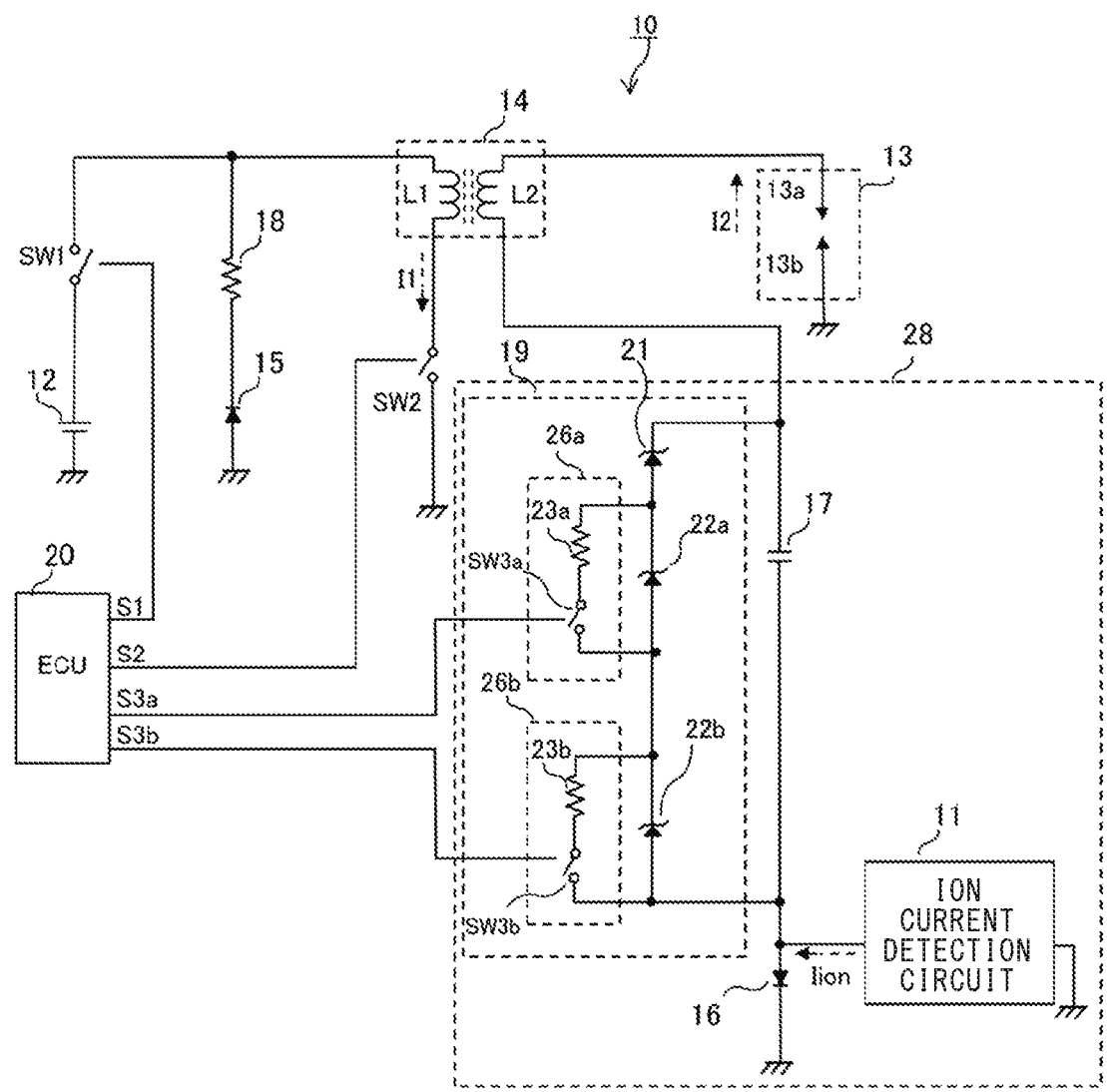
FIG. 5 is another electric circuit diagram showing a basic configuration of the control device of the internal combustion engine including the ion current detection device according to the first embodiment.

For simplicity, switching of the bias voltage Vbias for ion current detection is performed only in two stages, i.e., Hi and Low. However, a circuit that allows the bias voltage to be set at three or more stages may be formed by increasing the number of combinations of the second Zener diode 22 and the short circuit 26. FIG. 5 is a circuit diagram in which two second Zener diodes 22a and 22b are connected in series to each other, and the connected second Zener diodes 22a and 22b are further connected in parallel to the capacitor 17, and the two second Zener diode 22a and 22b are provided with short circuits 26a and 26b, respectively. The number of combinations of the second Zener diode 22 and the short circuit 26 is not limited to two.

The configuration of the ion-current-detection bias voltage control device 19 is not limited to the configuration described above as long as the ion-current-detection bias voltage control device 19 can adjust the bias voltage Vbias for ion current detection, and the ion-current-detection bias voltage control device 19 may be mounted at any place. For example, the ion-current-detection bias voltage control device 19 may be configured to, without using the resistance element 23, adjust the current of the short circuit 26 by controlling the gate terminal of an IGBT or a MOSFET. As for the mounting place, the ion-current-detection bias voltage control device 19 may be built in an ignition coil driver circuit (power IC) forming the switch SW2 or the like, may be implemented as a unit separate from the ignition coil, or may be built in the ECU 20.

[Control of Combustion State]

On the basis of output signals of the ion current detection devices 28, the ion current detection unit 201 performs an ion current detection process. Specifically, the ion current detection unit 201 performs noise processing and the like, and associates the detection value of each ion current with the crank angle or the like at the time point of the detection and stores the resultant detection value in the storage device 207 such as a RAM.

The combustion state determination unit 202 determines a combustion state on the basis of the relationship between a predetermined crank angle of each cylinder and ion current.

The combustion state control unit 203 performs a combustion state control process for controlling the combustion state on the basis of the combustion state determination result made by the combustion state determination unit 202, and performs control on, for example, the phase angles of the intake variable valve timing mechanism 114 and the exhaust variable valve timing mechanism 115, the injection strength of the injector 113, or the like.

The outline of the function of the control device 10 of the internal combustion engine 1 according to the present embodiment has been described. The control device 10 performs a step of supplying ignition energy to the ignition plug 13 to cause spark discharge, a step of stopping the spark discharge by the circulation device and detecting ion current, and a step of determining a combustion state on the basis of the detected ion current and controlling the combustion state. In the present disclosure, the step of detecting ion current will be mainly described.

In the present disclosure, one ignition cycle is a period from the step of supplying ignition energy to the ignition plug to cause spark discharge to the next step of supplying ignition energy to the ignition plug to cause spark discharge.

Figure 6:
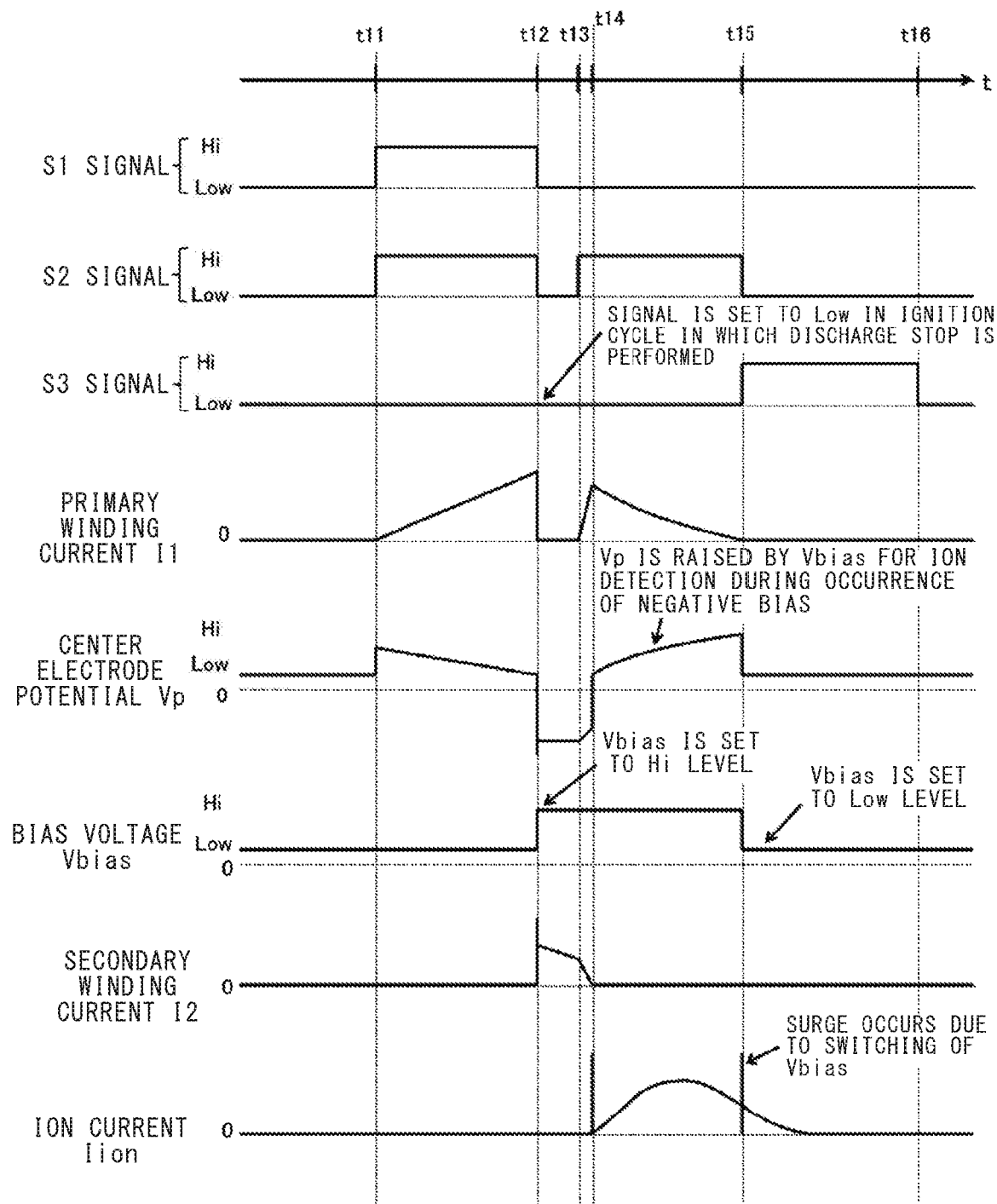
FIG. 6 is an operation timing chart of the control device of the internal combustion engine in a cycle in which discharge stop is performed according to the first embodiment.

FIG. 6 shows a timing chart indicating the respective states of the S1 signal, the S2 signal, the S3 signal, which are output signals of the ECU 20, the primary winding current I1 flowing in the primary winding L1 of the ignition coil 14, the potential Vp of the center electrode 13a of the ignition plug 13, the bias voltage Vbias charged in the capacitor 17, the secondary winding current I2 flowing to the ignition plug 13, and combustion-time ion current I1 on detected by an ion current detection circuit 11 during combustion.

In a case where electric charge of the capacitor 17 has already been reduced due to leak current, or in a case of the first ignition cycle, the bias voltage Vbias is not charged, and thus, the bias voltage Vbias in the timing chart starts below a Low level. However, for simplicity, the timing chart of this case is omitted.

Next, at a time point t11, the S1 signal and the S2 signal are switched from a Low level to a Hi level, to turn on the first switch SW1 and the second switch SW2, whereby the primary winding current I1 is caused to flow in the primary winding L1 of the ignition coil 14.

At a time point t12 when an energization time period set in advance has elapsed, the S1 signal and the S2 signal are switched from the Hi level to the Low level. Accordingly, the primary winding current I1 to the primary winding L1 of the ignition coil 14 is interrupted, negative high ignition voltage is applied to the center electrode 13a of the ignition plug 13, the potential Vp thereof sharply decreases, and spark discharge occurs between the center electrode 13a and the ground electrode 13b of the ignition plug 13. Simultaneously with the occurrence of the spark discharge, the capacitor 17 is charged to a Hi level voltage.

Then, at a time point t13 when a spark discharge keeping time period calculated on the basis of the operation state of the internal combustion engine has elapsed, the S2 signal is switched from the Low level to the Hi level again, to turn on the second switch SW2. Accordingly, the primary winding current I1 starts to flow in the primary winding L1 again.

At a time point t14, when the primary winding current I1 has reached a current value at which a magnetic field that corresponds to the magnetic flux remaining in the iron core of the ignition coil 14 is generated, voltage having a polarity opposite to that of the high ignition voltage generated in the secondary winding L2 during the spark discharge is induced in the secondary winding L2. Then, when the voltage between the center electrode 13a and the ground electrode 13b has become lower than the discharge keeping voltage, the spark discharge at the ignition plug 13 is forcibly interrupted. When the discharge stops, the center electrode potential Vp is raised by the charged bias voltage Vbias, and becomes a positive potential, whereby combustion state detection based on ion current is started.

At the time point t15, the S2 signal is switched from the Hi level to the Low level, whereby the second switch SW2 is turned off, the closed circuit formed by the primary winding L1 and the diode 15 is opened, and the discharge stopping operation is completed.

Simultaneously with this, at the time point t15, the S3 signal is switched from a Low level to a Hi level. Accordingly, the second Zener diode 22 enters a short-circuited state, and the bias voltage Vbias decreases to the Low level. From the time point t15, no negative bias is generated due to a change in the magnetic flux. Thus, similar to ordinary discharge operation, even when the bias voltage Vbias is at the Low level, the center electrode potential Vp has a positive bias, and ion detection can be performed without any problem. The time point t15 can be determined as desired, but may be sequentially calculated and estimated in accordance with the operation state of the internal combustion engine, or a map may be prepared in advance.

At a time point t16, the combustion state detection ends, the S3 signal to the third switch SW3 is switched from the Hi level to the Low level, and the discharge stopping operation in one ignition cycle of the internal combustion engine ends.

According to the system of the present embodiment, in an ignition cycle in which the internal combustion engine needs much ignition energy as in a low-load and low-rotation state or at the time of engine start, the combustion state detection can be performed without increasing energy loss even if the ignition operation is switched to ordinary ignition operation in which the discharge stopping operation by the circulation device is not performed.

Figure 7:
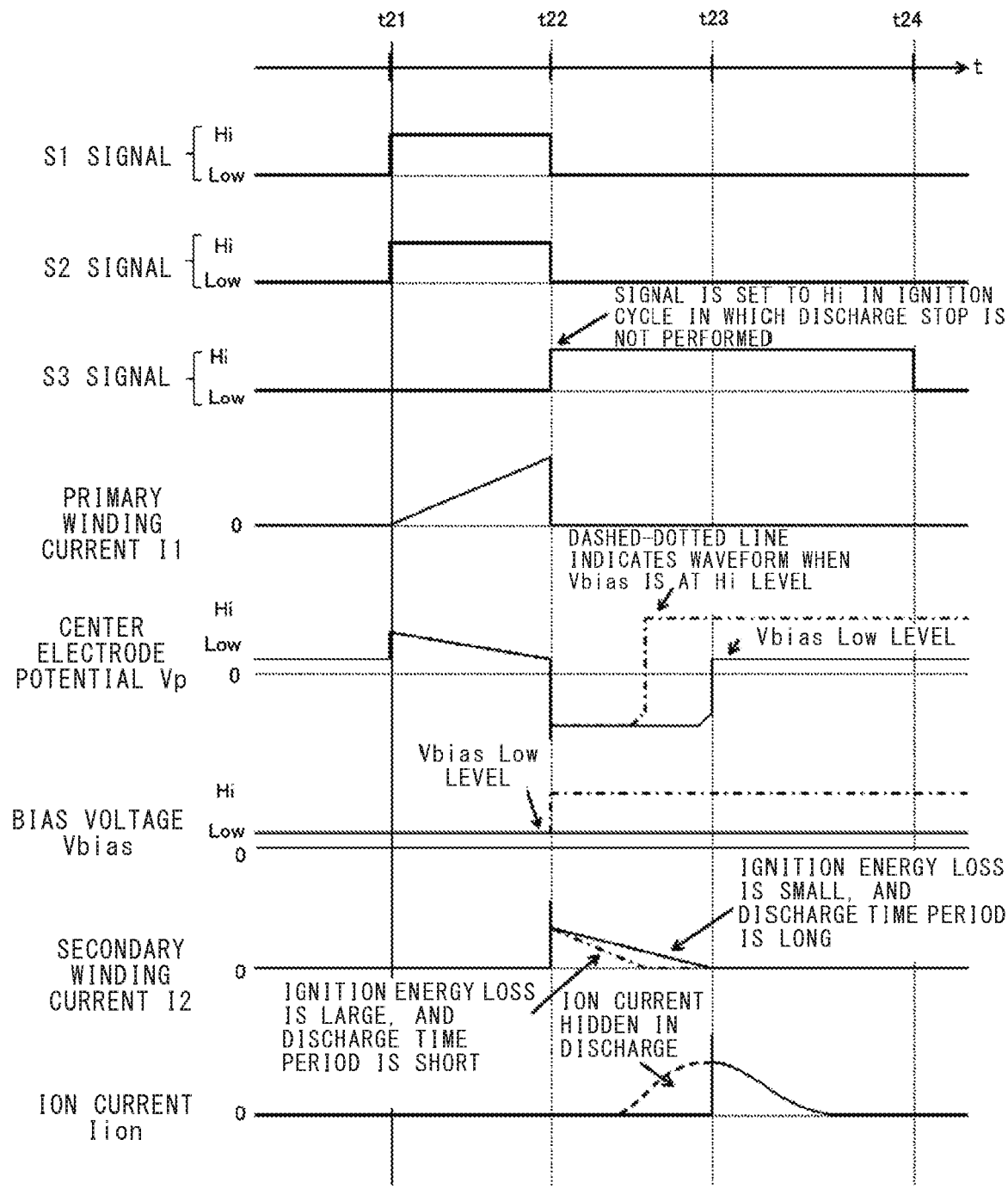
FIG. 7 is an operation timing chart of the control device of the internal combustion engine in a cycle in which discharge stop is not performed according to the first embodiment.

FIG. 7 shows a timing chart in an ignition cycle in which the discharge stopping operation by the circulation device is not performed. FIG. 7 shows a timing chart indicating the respective states of the S1 signal, the S2 signal, and the S3 signal, which are output signals of the ECU 20, the primary winding current I1 flowing in the primary winding L1 of the ignition coil 14, the potential Vp of the center electrode 13a of the ignition plug 13, the bias voltage Vbias charged in the capacitor 17, the secondary winding current I2 flowing to the ignition plug 13, and the combustion-time ion current Iion detected by the ion current detection circuit 11 during combustion.

The dashed-dotted line in the waveform of each of the center electrode potential Vp and the secondary winding current I2 represents a waveform realized when the bias voltage Vbias is fixed at a Hi level for a discharge stop cycle as indicated by the dashed-dotted line of the bias voltage Vbias.

In a case where electric charge of the capacitor 17 has already been reduced due to leak current, or in a case of the first ignition cycle, the bias voltage Vbias is not charged, and thus, the bias voltage Vbias in the timing chart starts below a Low level. However, for simplicity, the timing chart of this case is omitted.

At a time point t21, the S1 signal and the S2 signal are switched from a Low level to a Hi level, to turn on the first switch SW1 and the second switch SW2, whereby the primary winding current I1 is caused to flow in the primary winding L1 of the ignition coil 14.

At a time point t22 when an energization time period set in advance has elapsed, the S1 signal and the S2 signal are switched from the Hi level to the Low level. Accordingly, the primary winding current I1 to the primary winding L1 of the ignition coil 14 is interrupted, negative high ignition voltage is applied to the center electrode 13a of the ignition plug 13, the potential Vp thereof sharply decreases, and spark discharge occurs between the center electrode 13a and the ground electrode 13b of the ignition plug 13.

In an ignition cycle in which the discharge stopping operation is not performed, from t22, the S3 signal is switched from a Low level to a Hi level, and the second Zener diode 22 is in a short-circuited state also during spark discharge. Thus, the bias voltage Vbias during the spark discharge is raised only to the Low level. In addition, compared with a case where the bias voltage Vbias is at a Hi level, when the bias voltage Vbias is at a Low level, energy loss during spark discharge is smaller, and the discharge time period is longer.

At a time point t23, the spark discharge at the ignition plug ends, the center electrode potential Vp has a positive bias due to the bias voltage Vbias, and ion current detection is started. In a case where the discharge stopping operation is not performed, negative bias due to magnetic flux consumption is not generated, and thus, ion current can be detected even at the Low level.

At a time point t24, the combustion state detection based on ion current ends, the S3 signal to the third switch SW3 is switched from the Hi level to the Low level.

In the ignition cycle in which the discharge stopping operation by the circulation device is not performed, when compared with a case where the discharge stopping operation is performed, energy loss during spark discharge is small, and thus, ignition energy can be put in the ignition plug gap by the maximum amount. In order to reduce loss of ignition energy during spark discharge in a cycle in which the discharge stopping operation is not performed, the internal resistance in the short circuit may be set to 2 kΩ or less.

Figure 8A:
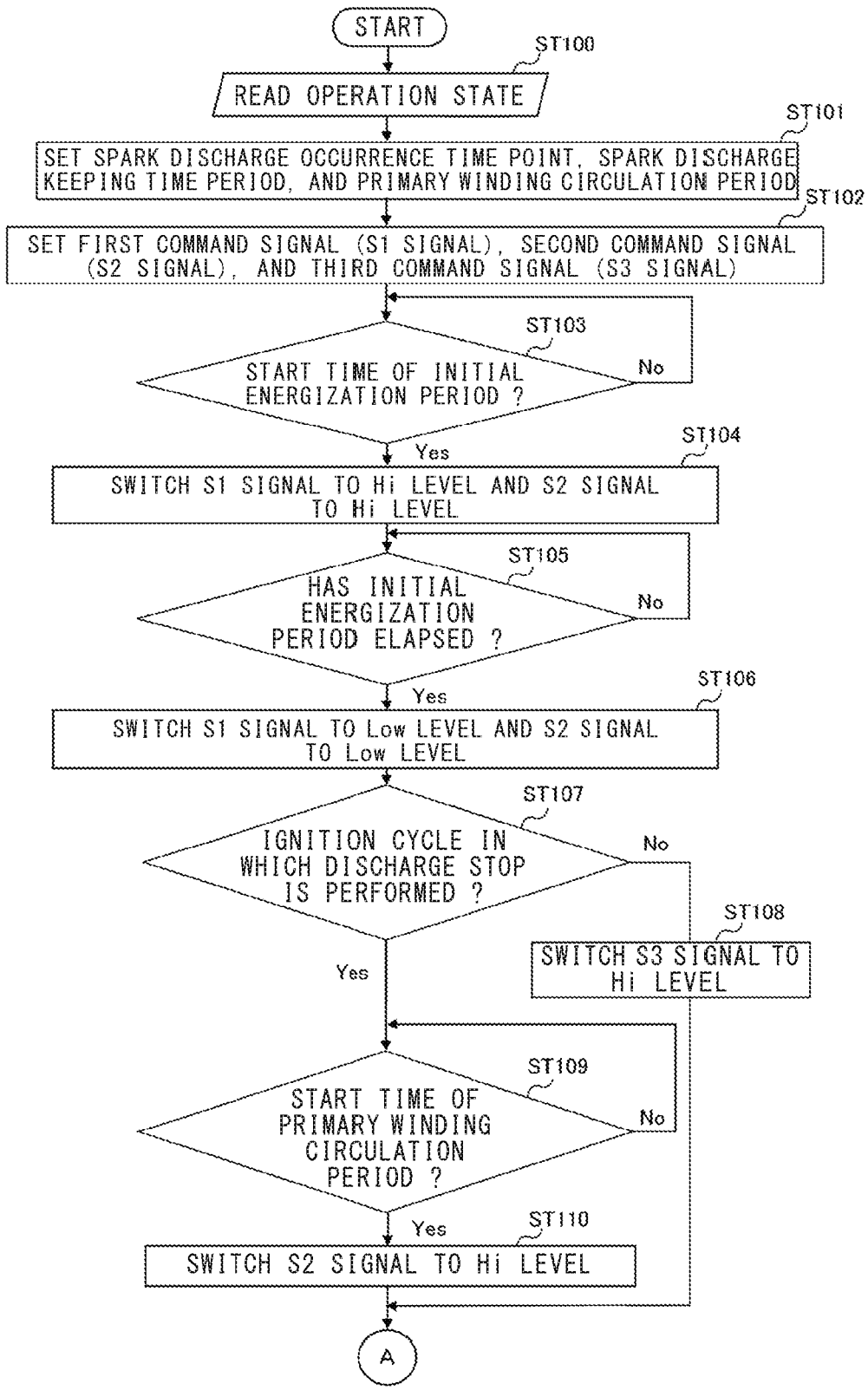
FIG. 8A is the first half of a flow chart showing a process performed by the control device of the internal combustion engine according to the first embodiment.
Figure 8B:
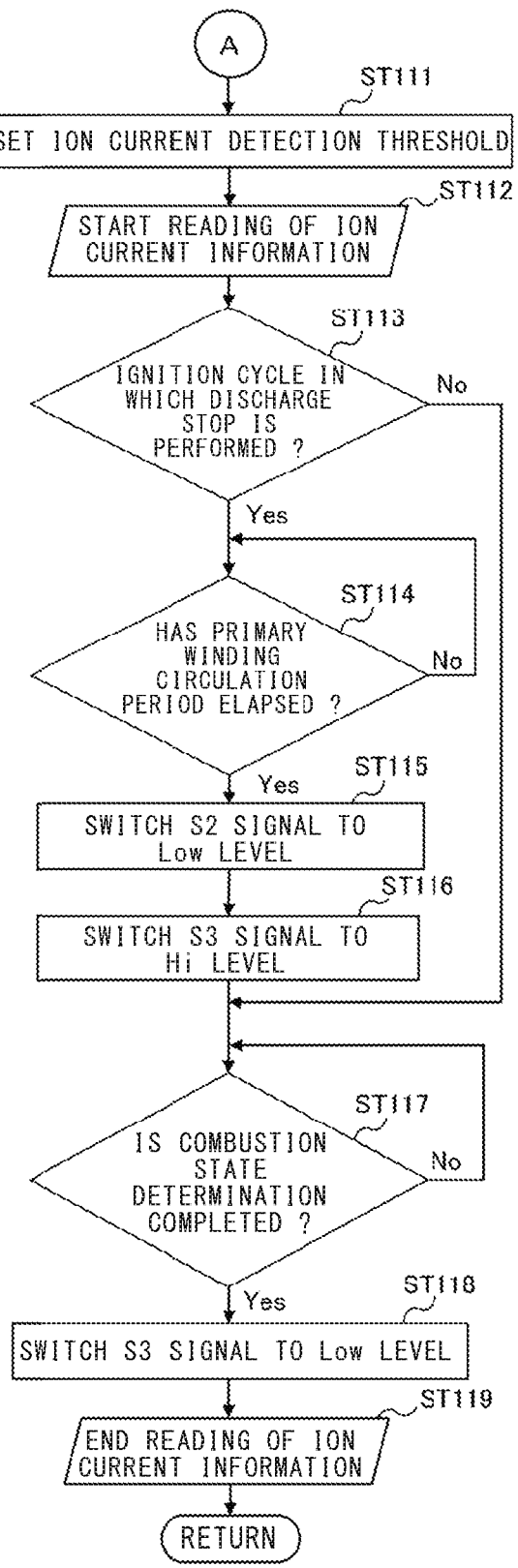
FIG. 8B is the second half of the flow chart showing the process, following the process in FIG. 8A, performed by the control device of the internal combustion engine according to the first embodiment.

Next, with reference to the flow chart shown in FIGS. 8A and 8B, the ion current detection process performed in the ECU 20 is described.

The ECU 20 comprehensively controls the spark discharge occurrence time, the fuel injection amount, the idle rotation rate, and the like of the internal combustion engine. For the ignition control process described below, the ECU 20 separately performs an operation state detection process for detecting the operation state of each section of the internal combustion engine, such as the intake air amount (intake pipe pressure), the rotation speed, the throttle opening degree, the cooling water temperature, the air intake temperature, and the like of the internal combustion engine.

First, in step ST100, reading of the operation state of the internal combustion engine is started.

In step ST101, on the basis of the read operation state, a spark discharge occurrence time point, a spark discharge keeping time period, and a primary winding circulation period are set.

In step ST102, on the basis of the spark discharge occurrence time point, the spark discharge keeping time period, and the operation state of the internal combustion engine, the S1 signal and the S2 signal for controlling ignition, and the S3 signal for controlling the bias voltage Vbias are set from an initial energization period for the primary winding L1 for causing spark discharge at the ignition plug 13 and a primary winding circulation period for short-circuiting both ends of the primary winding L1 to cause circulation. The initial value of each signal is at a Low level.

In step ST103, on the basis of the set initial energization period for the primary winding L1, whether the time has reached the start time of the initial energization period is determined. When the determination result is negative, the same step is repeated and the process is put on hold. When it has been determined that the time has reached the start time of the initial energization period, the process shifts to step ST104.

In step ST104, the S1 signal and the S2 signal are switched from the Low level to a Hi level. Accordingly, energization to the primary winding L1 of the ignition coil 14 is started (t11 in FIG. 6, t21 in FIG. 7).

In step ST105, it is determined whether the initial energization period for the primary winding L1 of the ignition coil 14 has reached a time period set in advance. When the determination result is negative, the same step is repeated and the process is put on hold. When it has been determined that the initial energization period has reached the set time period, the process shifts to step ST106.

In step ST106, the S1 signal and the S2 signal are switched from the Hi level to the Low level (t12 in FIG. 6, t22 in FIG. 7). Accordingly, the primary winding current I1 which has been flowing in the primary winding L1 of the ignition coil 14 is interrupted, high ignition voltage is generated in the secondary winding L2 of the ignition coil 14, and spark discharge occurs between the center electrode 13a and the ground electrode 13b of the ignition plug 13. Simultaneously with this, charging of the capacitor 17 is started.

In step ST107, it is determined whether the ignition cycle is an ignition cycle in which discharge stop is to be performed. When the determination result is positive, the process shifts to step ST109. When the determination result is negative, the process shifts to step ST108. Whether or not to perform discharge stop may be determined by use of information such as the operation state of the engine or a map set in advance.

In step ST108, the S3 signal is switched from a Low level to a Hi level (t22 in FIG. 7). Accordingly, charging of the capacitor 17 is restricted such that the bias voltage Vbias is at a Low level.

In step ST109, it is determined whether the time has reached the start time of the primary winding circulation period set in advance. When the determination result is negative, the same step is repeated and the process is put on hold. In the period when the same step is repeated, the bias voltage Vbias is charged to a Hi level. When it has been determined that the time has reached the start time of the set primary winding circulation period, the process shifts to step ST110.

In step ST110, the S2 signal is switched from the Low level to the Hi level. Both ends of the primary winding L1 of the ignition coil 14 are short-circuited, whereby current starts to flow in the primary winding L1, and the spark discharge is forcibly interrupted (t13 in FIG. 6).

In step ST111, an ion current detection threshold is set that is appropriate for the ignition cycle on the basis of the operation condition of the internal combustion engine, the smoldering state of the plug, and the like.

In step ST112, reading of ion current information is started, and combustion state determination is started (t14 in FIG. 6, t23 in FIG. 7).

In step ST113, it is determined whether the ignition cycle is an ignition cycle in which discharge stop is to be performed. When the determination result is positive, the process shifts to step ST114. When the determination result is negative, the process shifts to step ST117.

In step ST114, it is determined whether the time has reached the end time point of the primary winding circulation period set in advance. When the determination result is negative, the same step is repeated, and when it has been determined that the time has reached the end time point of the set primary winding circulation period, the process shifts to step ST115.

In step ST115, the S2 signal is switched from the Hi level to the Low level (t15 in FIG. 6). Accordingly, the discharge stopping operation ends.

In step ST116, the S3 signal is switched from a Low level to a Hi level. Accordingly, the bias voltage Vbias decreases to the Low level (t15 in FIG. 6).

In step ST117, it is determined whether the combustion state determination has been completed. When the determination result is negative, the same step is repeated, and when it has been determined that the combustion state determination has been completed, the process shifts to step ST118.

In step ST118, the S3 signal is switched from the Hi level to the Low level (t16 in FIG. 6, t24 in FIG. 7).

In step ST119, reading of the primary winding current and the ion current ends, and the ion current detection process performed in the ECU 20 ends.

The above described flow is the ion current detection process for one ignition cycle, and during the operation of the internal combustion engine, this flow is repeated.

In the present embodiment, the end time point of the primary winding circulation period is set in advance on the basis of the operation state of the internal combustion engine, but may be determined in real time by detecting the primary winding current I1, the voltage across both ends of the primary winding, and the like. For simplicity, the above description has been given by use of a circuit in which the bias voltage is switched between two values of a Hi level voltage and a Low level voltage. However, if a circuit configuration in which the bias voltage can be switched among a plurality of voltage values of three or more values is employed, the bias voltage can be adjusted to a bias voltage for ion current detection that is appropriate for a negative bias generation level for each ignition cycle, and more accurate ion current detection can be performed.

As described above, according to the internal combustion engine control device of the first embodiment, in accordance with the level of negative bias voltage generated due to a change in the magnetic flux during discharge stop in each ignition cycle and in accordance with whether or not discharge stop is performed, the ion-current-detection bias voltage can be set to an optimum voltage level. Therefore, without impairing the reliability and the durability of the internal combustion engine control device, the combustion state detection based on ion current detection can be accurately performed in a wide operation range of the internal combustion engine, and deterioration of combustibility due to loss of ignition energy is not caused.

Second Embodiment

Next, an internal combustion engine control device according to the second embodiment is described. In the second embodiment, an example is described in which the bias voltage Vbias for ion current detection during discharge stop is changed.

In the first embodiment, the bias voltage Vbias for ion current detection during discharge stop is a constant Hi level voltage. However, in the period of discharge stop, induction current gradually decreases due to consumption of the magnetic flux by the circulation, and when the magnetic flux in the iron core has been completely consumed, the circulation ends, and no negative bias is generated in the center electrode 13a anymore. Accordingly, in the later stage of the discharge stopping operation or after the discharge stopping operation, the center electrode potential Vp becomes excessively high, which results in a difference between the levels of the bias voltage for ion current detection at the start of discharge stop and at the end of the discharge stop (see the center electrode potential Vp at t14 and t15 in FIG. 6). In this case, a difference occurs in the ion current value depending on the timing of detection even when the ion generation amount due to combustion is the same. In addition, there is a problem in which, when the bias voltage Vbias is abruptly changed at the switching time point of the bias voltage Vbias for ion current detection, noise is superimposed on the ion current Iion that is detected (see the ion current waveform Iion at t15 in FIG. 6). Therefore, the obtained ion current information needs to be corrected and subjected to noise processing by the ECU 20.

In such a case, the bias voltage for ion current detection during the discharge stop may be controlled so as to gradually decrease such that th z z e center electrode potential in the ion current detection period becomes constant or close to constant. This eliminates any difference, which is caused by and dependent on the detection timing, in the ion current detection sensitivity, and occurrence of ion current noise at the bias voltage switching time point. Thus, more stable combustion state detection is enabled.

Figure 9:
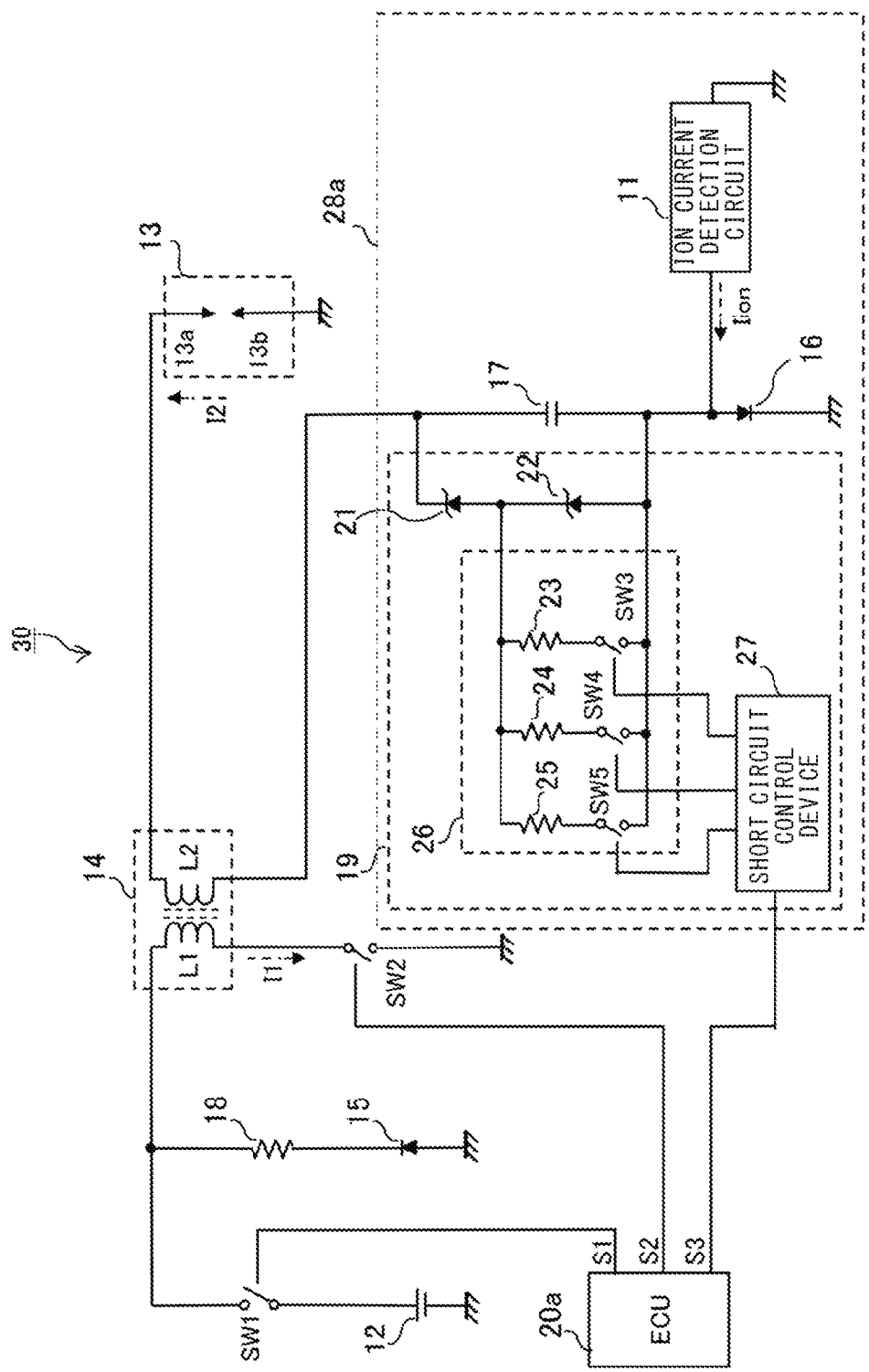
FIG. 9 is an electric circuit diagram showing a basic configuration of a control device of an internal combustion engine including an ion current detection device according to the second embodiment of the present disclosure.

FIG. 9 is an electric circuit diagram showing a basic configuration of an internal combustion engine control device 30 according to the second embodiment. In the present embodiment, a single cylinder internal combustion engine is described. However, the present embodiment can also be applied to an internal combustion engine including a plurality of cylinders. In that case, control devices having similar basic configurations may be provided by the number of cylinders, or some components such as an ion current detection circuit may be shared by the plurality of cylinders.

In the second embodiment, an embodiment is described in which the bias voltage Vbias is adjusted such that the center electrode potential Vp during the ion detection period becomes constant or close to constant. The basic configuration other than the internal configuration of the ion-current-detection bias voltage control device 19 of the control device 30 is the same as that in the first embodiment shown in FIG. 1. Thus, description of components other than the ion-current-detection bias voltage control device 19 is omitted, and the ion-current-detection bias voltage control device 19 is described by use of FIG. 1 and the same reference characters used therein.

In FIG. 9, in the ion-current-detection bias voltage control device 19 of an ion current detection device 28a, the first Zener diode 21 and the second Zener diode 22, which are for clamping at a constant value the voltage of the capacitor 17 storing the bias voltage for ion current detection, are connected, and a short circuit 26 and a short circuit control device 27 for controlling the short circuit 26 are connected in parallel to the second Zener diode 22.

The short circuit 26 is composed of: a first short circuit in which the resistance element 23 and the third switch SW3 are connected in series to each other; a second short circuit in which a resistance element 24 and a fourth switch SW4 are connected in series to each other; and a third short circuit in which a resistance element 25 and a fifth switch SW5 are connected in series to each other, the first short circuit, the second short circuit, and the third short circuit being connected in parallel to one another. Similar to the first switch SW1 to the third switch SW3 described in the first embodiment, switching means composed of any semiconductor element such as a MOSFET, an IGBT, or a transistor may be used as the fourth switch SW4 and the fifth switch SW5.

The short circuit control device 27 receives, from the ECU 20: the S3 signal which commands a timing at which both ends of the second Zener diode 22 are short-circuited; and a target value of a bias voltage decreasing speed that cancels any change in the negative bias during discharge stop and that makes the center electrode potential constant or close to constant, and the short circuit control device 27 controls the switch unit (SW3 to SW5) in the short circuit 26 so as to produce a combined resistance that satisfies the target value. The means for receiving the target value from the ECU 20 is not shown, but it is assumed that the target value is received through a communication line for CAN (controller area network) communication or the like.

In the first embodiment, the resistance element 23 and the third switch SW3 are connected in series to each other in the short circuit 26, and thus, the bias voltage Vbias is abruptly decreased by changing the switch SW3 from OFF to ON. In the circuit shown in FIG. 9, the short circuit 26 has series circuits composed of three sets of a resistance element and a switch which are connected in parallel to one another. Thus, if the switches SW3 to SW5 are sequentially turned on and off, or if the turning on and off is performed in various combinations, a combined resistance that satisfies the target value of the bias voltage decreasing speed can be produced.

By decreasing the voltage of the capacitor 17 at a desired speed on the basis of the above-described circuit configuration, it is possible to control the center electrode potential during the ion current detection so as to be constant or close to constant. This eliminates any difference, which is caused by and dependent on the detection timing, in the ion current detection sensitivity, and occurrence of noise at the bias voltage switching time point. Thus, more stable combustion state detection is enabled.

The internal resistance (combined resistance) in the short circuit 26 needs to be settable to a resistance value that can cancel any change in the negative bias caused by magnetic flux consumption during discharge stop. Specifically, the internal resistance is preferably settable to be in a range of about 50 kΩ to about 500 kΩ.

In the present embodiment, the target value of the bias voltage decreasing speed is received from the ECU 20 through a communication line for CAN communication or the like. However, the communication means is not limited thereto, and various methods can be employed in which, for example, the target value is received as a voltage level or the like used together with the S3 signal. Alternatively, a calculation device may be built in the control device 30 separately from the ECU 20, and the calculation device may calculate the target value, or may have a map in advance. In order to appropriately set the target value for each ignition cycle, the changing speed of the negative bias applied to the center electrode 13a is estimated on the basis of the information of the primary winding current during discharge stop and the information of voltage across both ends of the primary winding, whereby the target value of the bias voltage decreasing speed may be calculated by using the estimated changing speed.

The configuration of the ion-current-detection bias voltage control device 19 is not limited to the configuration described above as long as the ion-current-detection bias voltage control device 19 can adjust the bias voltage for ion current detection, and the ion-current-detection bias voltage control device 19 may be mounted at any place. Although switching of the bias voltage for ion current detection is performed only in two stages, a circuit in which the bias voltage is switched among three or more stages may be formed by increasing the number of combinations of the above-described Zener diode and the above-described short circuit. As for the mounting place, the ion-current-detection bias voltage control device 19 may be built in an ignition coil driver circuit (power IC) forming the SW2 or the like, may be implemented as a unit separate from the ignition coil, or may be built in the ECU 20.

For simplicity, the bias voltage decreasing speed is adjusted through combination of three sets of a resistor and a switch. However, any configuration may be employed as long as the bias voltage decreasing speed can be adjusted. For example, the circuit may be further simplified into one set of a resistor and a switch, or a greater number of resistance elements and switching elements may be combined to allow fine adjustment of the bias voltage decreasing speed.

Figure 10:
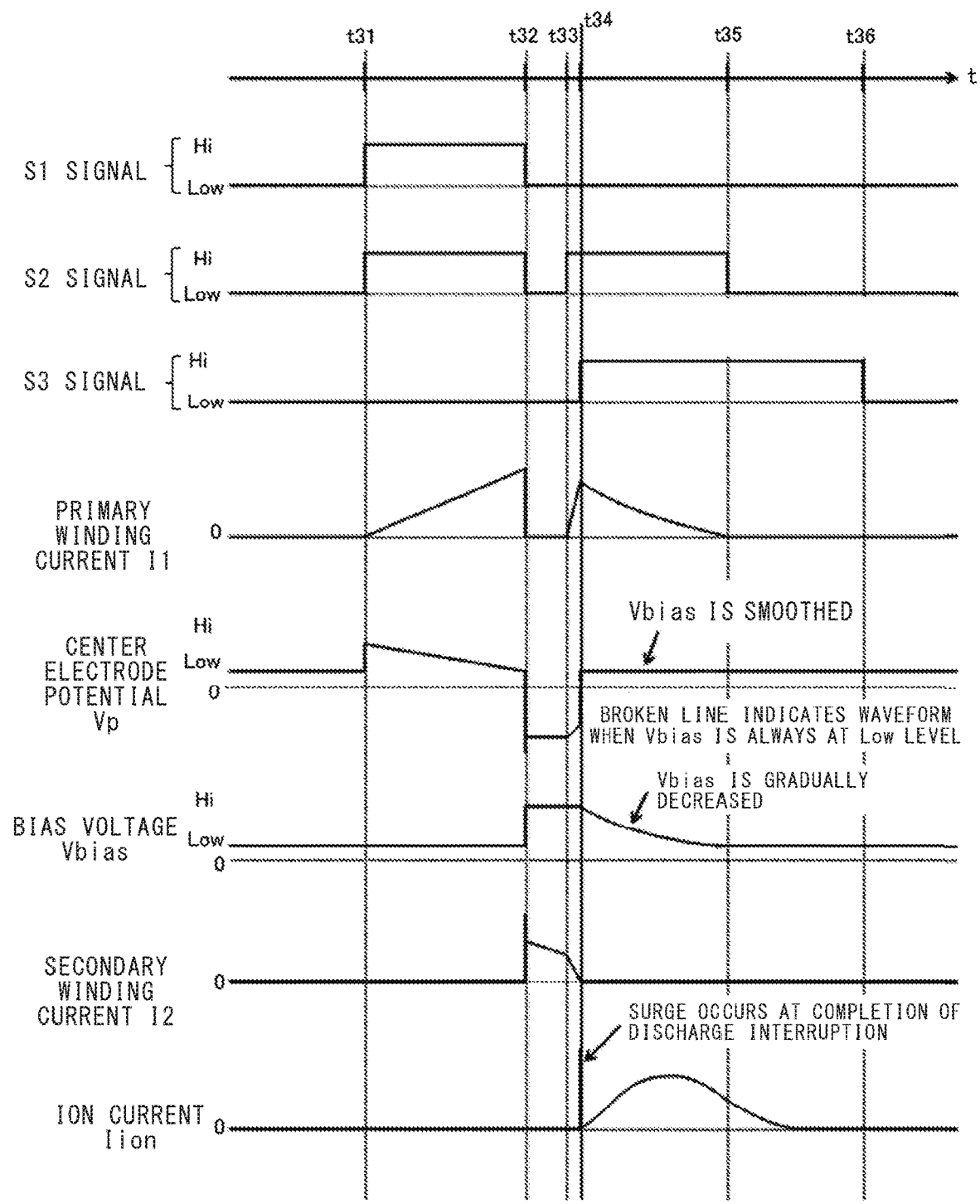
FIG. 10 is an operation timing chart of the control device of the internal combustion engine in a cycle in which discharge stop is performed according to the second embodiment.

FIG. 10 shows a timing chart indicating the respective states of the S1 signal, the S2 signal, and the S3 signal, which are output signals of the ECU 20, the primary winding current I1 flowing in the primary winding L1 of the ignition coil 14, the potential Vp of the center electrode 13a of the ignition plug 13, the bias voltage Vbias charged in the capacitor 17, the secondary winding current I2 flowing to the ignition plug 13, and the combustion-time ion current Iion detected by the ion current detection circuit 11 during combustion, according to the present embodiment.

In a case where electric charge of the capacitor 17 has already been reduced due to leak current, or in a case of the first ignition cycle, the bias voltage Vbias is not charged, and thus, the bias voltage Vbias in the timing chart starts below a Low level. However, for simplicity, the timing chart of this case is omitted.

At a time point t31, the S1 signal and the S2 signal are switched from a Low level to a Hi level, to turn on the first switch SW1 and the second switch SW2, whereby the primary winding current I1 is caused to flow in the primary winding L1 of the ignition coil 14.

At a time point t32 when an energization time period set in advance has elapsed, the S1 signal and the S2 signal are switched from the Hi level to the Low level. Accordingly, the primary winding current I1 to the primary winding L1 of the ignition coil 14 is interrupted, negative high ignition voltage is applied to the center electrode 13a of the ignition plug 13, the potential Vp thereof sharply decreases, and spark discharge occurs between the center electrode 13a and the ground electrode 13b of the ignition plug 13. Simultaneously with the occurrence of the spark discharge, the capacitor 17 is charged to a Hi level voltage.

Then, at a time point t33 when a spark discharge keeping time period calculated on the basis of the operation state of the internal combustion engine has elapsed, the S2 signal is switched from the Low level to the Hi level again, to turn on the second switch SW2. Accordingly, the primary winding current I1 starts to flow in the primary winding L1 again.

At a time point t34, when the primary winding current I1 has reached a current value at which a magnetic field that corresponds to the magnetic flux remaining in the iron core of the ignition coil 14 is generated, voltage having a polarity opposite to that of the high ignition voltage generated in the secondary winding L2 during the spark discharge is induced in the secondary winding L2. Then, when the voltage between the center electrode 13a and the ground electrode 13b has become lower than the discharge keeping voltage, the spark discharge at the ignition plug 13 is forcibly interrupted. Then, the center electrode potential Vp becomes a positive potential due to the charged bias voltage Vbias, whereby combustion state detection based on ion current is started.

Simultaneously with completion of the discharge interruption, the S3 signal is switched from a Low level to a Hi level. Accordingly, the short circuit control device 27 starts control such that the bias voltage Vbias gradually decreases.

The time point t34 when the discharge interruption is completed varies in accordance with the magnetic flux remaining in the iron core of the ignition coil and the engine operation condition. Therefore, in order to accurately detect the time point at which the discharge interruption is completed, the time point t34 may be calculated by using current information of the primary winding circulation, or may be detected by detecting ion current surge that occurs at the time of discharge interruption. In order to determine the time point t34 in a simple manner, a map may be prepared in advance from an experiment or the like, and the map may be used.

Since the short circuit 26 is controlled by the short circuit control device 27 such that an appropriate bias voltage decreasing speed is realized, any change in the negative bias voltage due to consumption of the magnetic flux by the circulation is canceled, and the center electrode potential Vp of the ignition plug becomes constant.

At a time point t35, the S2 signal is switched from the Hi level to the Low level, whereby the second switch SW2 is turned off. The time point t35 may be determined as desired, but may be sequentially calculated and estimated in accordance with the operation state of the internal combustion engine, or a map may be prepared in advance.

At a time point t36, the combustion state detection based on ion current ends, the S3 signal is switched from the Hi level to the Low level, whereby the short-circuited state of both ends of the second Zener diode 22 is eliminated (switches SW3 to SW5 are turned off), and the discharge stopping operation in one ignition cycle of the internal combustion engine ends.

The operation when the discharge stop by the circulation device is not performed in the second embodiment is the same as the operation when the discharge stop is not performed in the first embodiment, and thus, the timing chart is omitted.

Figure 11A:
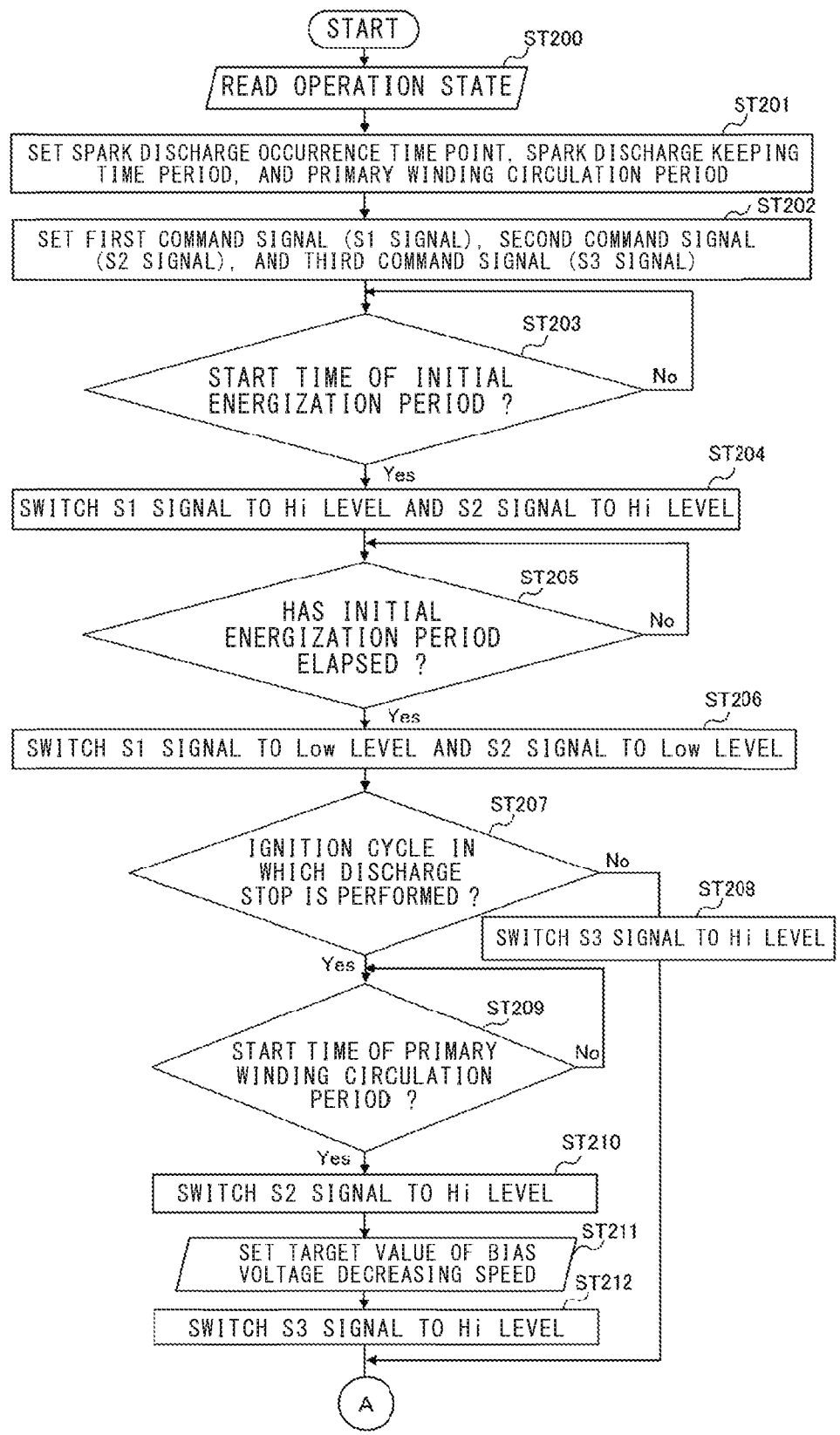
FIG. 11A is the first half of a flow chart showing a process performed by the control device of the internal combustion engine according to the second embodiment.
Figure 11B:
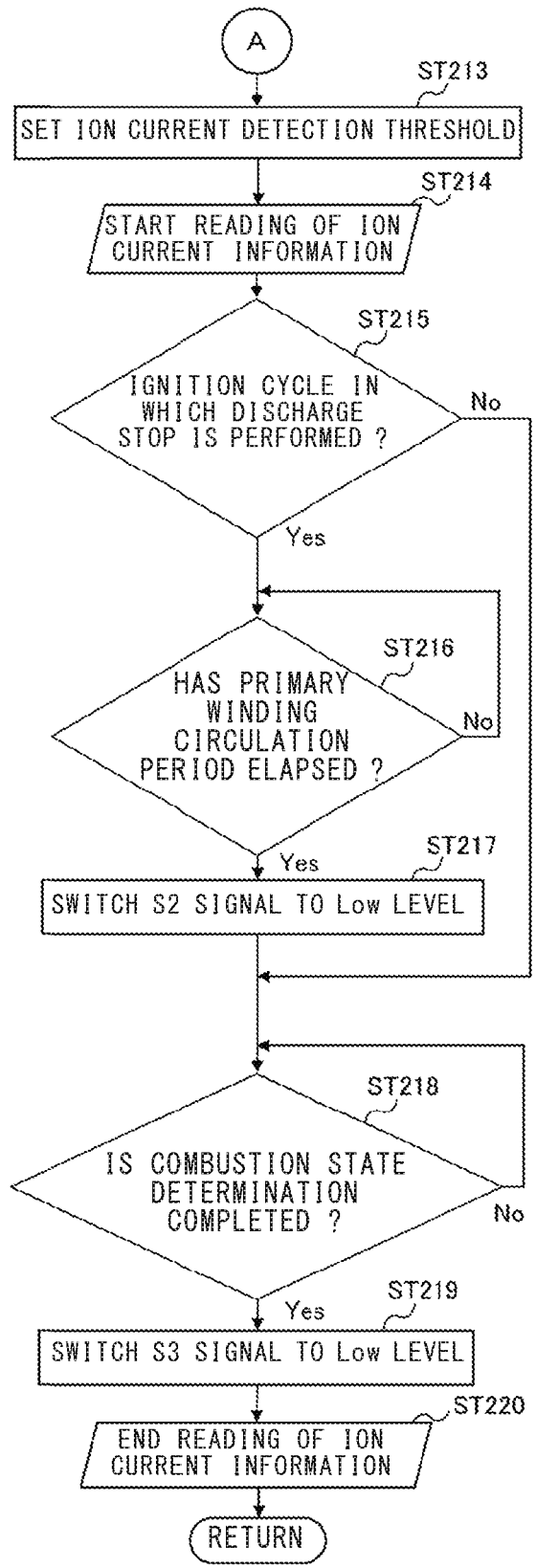
FIG. 11B is the second half of the flow chart showing the process, following the process in FIG. 11A, performed by the control device of the internal combustion engine according to the second embodiment.
Figure 12:
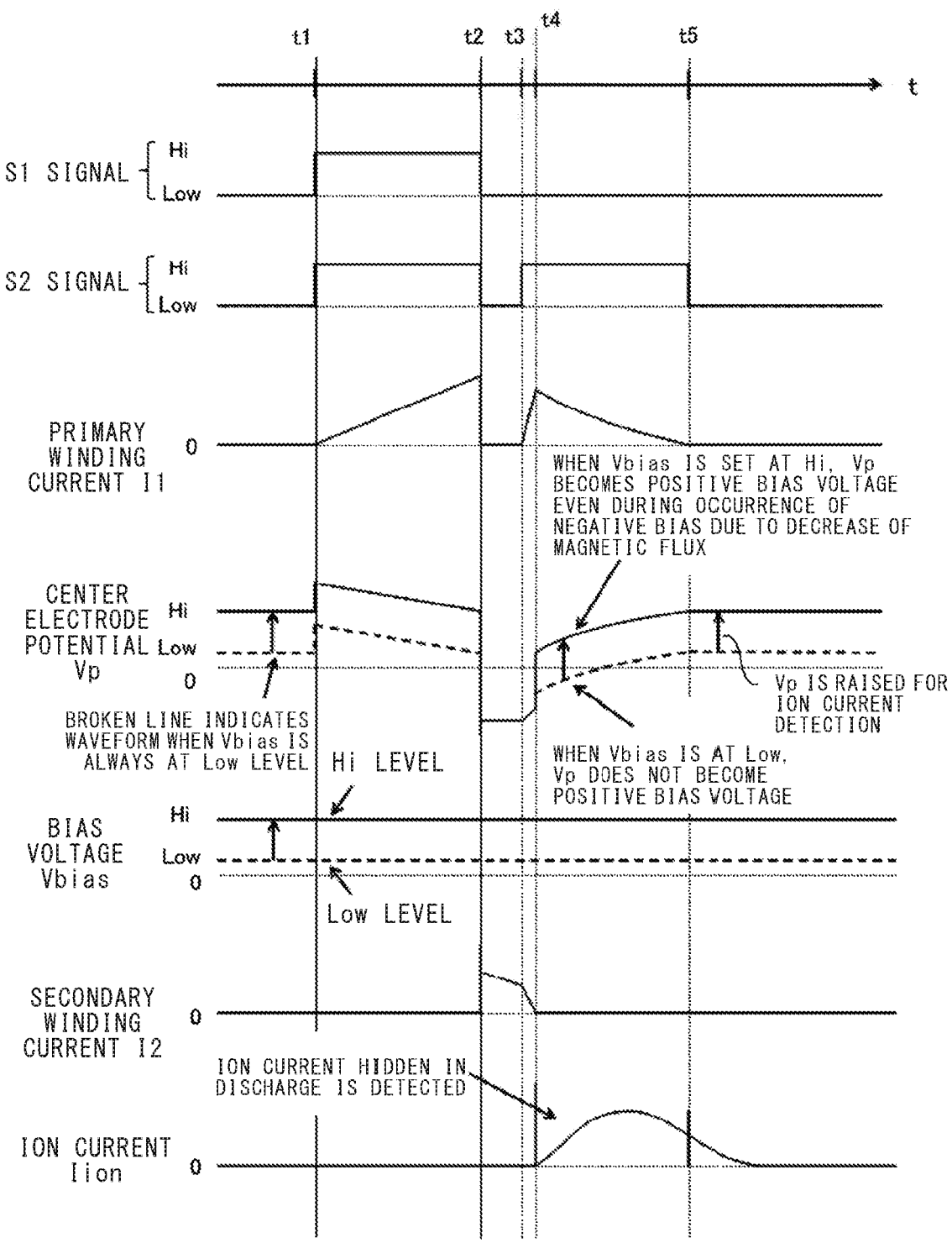
FIG. 12 is an operation timing chart when the level of ion-current-detection bias voltage is increased by a control device and a discharge stopping device of a conventional internal combustion engine.

Next, with reference to the flow chart shown in FIGS. 11A and 11B, the ion current detection process performed in the ECU 20 is described.

The ECU 20 comprehensively controls the spark discharge occurrence time, the fuel injection amount, the idle rotation rate, and the like of the internal combustion engine. For the ignition control process described below, the ECU 20 separately performs an operation state detection process for detecting the operation state of each section of the internal combustion engine, such as the intake air amount (intake pipe pressure), the rotation speed, the throttle opening degree, the cooling water temperature, the air intake temperature, and the like of the internal combustion engine.

First, in step ST200, reading of the operation state of the internal combustion engine is started.

In step ST201, on the basis of the read operation state, a spark discharge occurrence time point, a spark discharge keeping time period, and a primary winding circulation period are set.

In step ST202, on the basis of the spark discharge occurrence time point, the spark discharge keeping time period, and the operation state of the internal combustion engine, the S1 signal and the S2 signal for controlling ignition, and the S3 signal for controlling the bias voltage Vbias, are set from an initial energization period for the primary winding L1 for causing spark discharge at the ignition plug 13 and a primary winding circulation period for short-circuiting both ends of the primary winding L1 to cause circulation. The initial value of each signal is at a Low level.

In step ST203, on the basis of the set initial energization period for the primary winding L1, whether the time has reached the start time of the initial energization period is determined. When the determination result is negative, the same step is repeated and the process is put on hold. When it has been determined that the time has reached the start time of the initial energization period, the process shifts to step ST204.

In step ST204, the S1 signal and the S2 signal are switched from the Low level to a Hi level. Accordingly, energization to the primary winding L1 of the ignition coil 14 is started.

In step ST205, it is determined whether the initial energization period for the primary winding L1 of the ignition coil 14 has reached a time period set in advance. When the determination result is negative, the same step is repeated and the process is put on hold. When it has been determined that the initial energization period has reached the set time period, the process shifts to step ST206.

In step ST206, the S1 signal and the S2 signal are switched from the Hi level to the Low level. Accordingly, the primary winding current I1 which has been flowing in the primary winding L1 of the ignition coil 14 is interrupted, high ignition voltage is generated in the secondary winding L2 of the ignition coil 14, and spark discharge occurs between the center electrode 13a and the ground electrode 13b of the ignition plug 13. Simultaneously with this, charging of the capacitor 17 is started.

In step ST207, it is determined whether the ignition cycle is an ignition cycle in which discharge stop is to be performed. When the determination result is positive, the process shifts to step ST209. When the determination result is negative, the process shifts to step ST208. Whether or not to perform discharge stop may be determined by use of information such as the operation state of the engine or a map set in advance.

In step ST208, the S3 signal is switched from a Low level to a Hi level. On the basis of this S3 signal, the short circuit control device 27 controls the switch unit (switches SW3 to SW5) of the short circuit 26 such that the level of the bias voltage Vbias becomes the Low level.

In step ST209, it is determined whether the time has reached the start time of the primary winding circulation period set in advance. When the determination result is negative, the same step is repeated and the process is put on hold. In the period when the same step is repeated, the bias voltage Vbias is charged to a Hi level. When it has been determined that the time has reached the start time of the set primary winding circulation period, the process shifts to step ST210.

In step ST210, the S2 signal is switched from the Low level to the Hi level and both ends of the primary winding L1 of the ignition coil 14 are short-circuited, whereby current starts to flow in the primary winding L1, and the spark discharge is forcibly interrupted.

In step ST211, a target value, of the bias voltage decreasing speed, that cancels any change in the negative bias during the discharge stop and that makes the center electrode potential to be constant or close to constant, is set.

In step ST212, the S3 signal is switched from the Low level to the Hi level. On the basis of this S3 signal, the short circuit control device 27 controls the switch unit (switches SW3 to SW5) of the short circuit 26 such that a combined resistance that satisfies the target value of the bias voltage decreasing speed is produced.

In step ST213, an ion current detection threshold is set that is appropriate for the ignition cycle on the basis of the operation condition of the internal combustion engine, the smoldering state of the plug, and the like.

In step ST214, reading of ion current information is started, and combustion state determination is started.

In step ST215, it is determined whether the ignition cycle is an ignition cycle in which discharge stop is to be performed. When the determination result is positive, the process shifts to step ST216. When the determination result is negative, the process shifts to step ST218.

In step ST216, it is determined whether the time has reached the end time point of the primary winding circulation period set in advance. When the determination result is negative, the same step is repeated, and when it has been determined that the time has reached the end time point of the set primary winding circulation period, the process shifts to step ST217.

In step ST217, the S2 signal is switched from the Hi level to the Low level. Accordingly, the discharge stopping operation ends.

In step ST218, it is determined whether the combustion state determination has been completed. When the determination result is negative, the same step is repeated, and when it has been determined that the combustion state determination has been completed, the process shifts to step ST219.

In step ST219, the S3 signal is switched from the Hi level to the Low level.

In step ST220, reading of the primary winding current I1 and the ion current ends, and the ion current detection process performed in the ECU 20 ends.

The above described flow is the ion current detection process for one ignition cycle, and during the operation of the internal combustion engine, this flow is repeated.

In the present embodiment, the end time point of the primary winding circulation period is set in advance on the basis of the operation state of the internal combustion engine, but may be determined in real time by detecting the primary winding current I1 and the like. For simplicity, the above description has been given by use of a circuit in which the bias voltage Vbias is switched between two values of a Hi level voltage and a Low level voltage. However, if a circuit configuration in which the bias voltage Vbias can be switched among a plurality of voltage values of three or more values is employed, the bias voltage Vbias can be adjusted to a bias voltage Vbias for ion current detection that is appropriate for a negative bias generation level for each ignition cycle, and more accurate ion current detection can be performed.

As described above, according to the internal combustion engine control device of the second embodiment, in accordance with the level of negative bias voltage generated due to a change in the magnetic flux during discharge stop in each ignition cycle and in accordance with whether or not discharge stop is performed, the ion-current-detection bias voltage during discharge stop can be gradually decreased such that the center electrode potential during the ion detection period becomes constant or close to constant. This eliminates any difference, which is caused by and dependent on the detection timing, in the ion current detection sensitivity, and occurrence of noise at the bias voltage switching time point. Thus, more stable combustion state detection is enabled, and neither the reliability nor the durability of the internal combustion engine control device is impaired.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10, 30 control device
11 ion current detection circuit
12 power supply device
13 ignition plug
13a center electrode
13b ground electrode
14 ignition coil
15 diode
16 back flow prevention diode
17 capacitor
18 resistance element
19 ion-current-detection bias voltage control device
20 electronic control device (ECU)
21 first Zener diode
22, 22a, 22b second Zener diode
23, 23a, 22b, 24, 25 resistance element
26, 26a, 26b short circuit
27 short circuit control device
28 ion current detection device
L1 primary winding
L2 secondary winding
SW1 first switch
SW2 second switch
SW3, SW3a, SW3b third switch
SW4 fourth switch
SW5 fifth switch
I1 primary winding current
I2 secondary winding current
Vp center electrode potential
Vbias bias voltage
Iion ion current

What is claimed is:

1. An internal combustion engine control device comprising:
   an ignition plug having a first electrode and a second electrode which are opposed to each other with a gap therebetween, the ignition plug being for igniting a combustible air-fuel mixture in a combustion chamber;
   an ignition device including a primary winding supplied with current from a power supply device and a secondary winding magnetically coupled to the primary winding, the ignition device being for supplying ignition energy to the ignition plug;
   an ion current detection device having an ion current detection circuit and an ion-current-detection bias voltage control device, the ion current detection circuit being for detecting, as ion current, ion generated in the combustion chamber as a result of the combustible air-fuel mixture being combusted due to spark discharge caused by the ignition energy, the ion-current-detection bias voltage control device being for controlling bias voltage for ion current detection; and
   a circulation device for short-circuiting the primary winding to cause a circulation route to enter a conduction state, thereby stopping the spark discharge, wherein
   the ion-current-detection bias voltage control device performs control such that: the bias voltage is increased such that a potential of the first electrode becomes a positive voltage during a period in which the spark discharge is stopped by the circulation device and ion current is detected; and the bias voltage is decreased at an end of the period in which the spark discharge is stopped by the circulation device.

2. The internal combustion engine control device according to claim 1, comprising
a driver circuit having mounted therein a switch for controlling conduction and interruption of current that is supplied from the power supply device to the primary winding, wherein
the ion-current-detection bias voltage control device is built in the driver circuit.

3. The internal combustion engine control device according to claim 1, wherein
the ion-current-detection bias voltage control device comprises: a parallel circuit composed of a capacitor and a Zener diode; and a short circuit for short-circuiting both ends of the Zener diode.

4. The internal combustion engine control device according to claim 3, wherein
the short circuit comprises a series circuit composed of a resistor and a switch.

5. The internal combustion engine control device according to claim 3, wherein
in an ignition cycle in which the spark discharge stop by the circulation device is not performed among the plurality of ignition cycles, an internal resistance value of the short circuit is 2 kΩ or less.

6. The internal combustion engine control device according to claim 3, wherein
the short circuit is configured such that, when the bias voltage is switched to a lower voltage level outside the period in which ion current is detected, an internal resistance value of the short circuit is not less than 20Ω.

7. The internal combustion engine control device according to claim 6, wherein
the short circuit is configured such that, during the period in which ion current is detected, the internal resistance value of the short circuit is in a range of 50 kΩ to 500 kΩ.

8. The internal combustion engine control device according to claim 3, wherein
the ion-current-detection bias voltage control device comprises: a plurality of the Zener diodes which are connected in series to each other and which are connected in parallel to the capacitor; and the short circuits which are respectively provided for the plurality of the Zener diodes and which each short-circuit both ends of a corresponding one of the Zener diodes.

9. The internal combustion engine control device according to claim 8, wherein
each short circuit comprises a series circuit composed of a resistor and a switch.

10. The internal combustion engine control device according to claim 8, wherein
the ion-current-detection bias voltage control device controls the bias voltage such that the potential of the first electrode becomes a constant positive voltage during the period in which the spark discharge is stopped by the circulation device and ion current is detected.

11. The internal combustion engine control device according to claim 10, wherein
the ion-current-detection bias voltage control device controls a decreasing speed of the bias voltage by use of internal resistance of each short circuit such that the potential of the first electrode becomes a constant positive voltage during the period in which the spark discharge is stopped by the circulation device and ion current is detected.

12. The internal combustion engine control device according to claim 11, wherein
each short circuit is composed of a plurality of sets of a resistor and a switch which are connected in series to each other, the plurality of sets being connected in parallel to each other, and
an internal resistance value of the short circuit is adjusted through combination of conduction states of the plurality of the switches.

13. The internal combustion engine control device according to claim 3, wherein
the ion-current-detection bias voltage control device controls the bias voltage such that the potential of the first electrode becomes a constant positive voltage during the period in which the spark discharge is stopped by the circulation device and ion current is detected.

14. The internal combustion engine control device according to claim 13, wherein
the ion-current-detection bias voltage control device controls a decreasing speed of the bias voltage by use of internal resistance of the short circuit such that the potential of the first electrode becomes a constant positive voltage during the period in which the spark discharge is stopped by the circulation device and ion current is detected.

15. The internal combustion engine control device according to claim 14, wherein
the short circuit is composed of a plurality of sets of a resistor and a switch which are connected in series to each other, the plurality of sets being connected in parallel to each other, and
an internal resistance value of the short circuit is adjusted through combination of conduction states of the plurality of the switches.

16. The internal combustion engine control device according to claim 14, wherein
a time point at which the ion-current-detection bias voltage control device starts the control of the decreasing speed of the bias voltage such that the potential of the first electrode becomes a constant positive voltage is calculated from information of ion current surge that occurs when the spark discharge is stopped.

17. The internal combustion engine control device according to claim 14, wherein
a target value of the decreasing speed of the bias voltage controlled by the ion-current-detection bias voltage control device is calculated from information of voltage across both ends of the primary winding or information of circulation current of the primary winding while the spark discharge is stopped, and the target value is determined for each ignition cycle.

18. A method for controlling an internal combustion engine including:
an ignition plug having a first electrode and a second electrode which are opposed to each other with a gap therebetween, the ignition plug being for igniting a combustible air-fuel mixture in a combustion chamber;
an ignition device including a primary winding supplied with current from a power supply device and a secondary winding magnetically coupled to the primary winding, the ignition device being for supplying ignition energy to the ignition plug;

an ion current detection device having an ion current detection circuit and an ion-current-detection bias voltage control device, the ion current detection circuit being for detecting, as ion current, ion generated in the combustion chamber as a result of the combustible air-fuel mixture being combusted due to spark discharge caused by the ignition energy, the ion-current-detection bias voltage control device being for controlling bias voltage for ion current detection; and a circulation device for short-circuiting the primary winding to cause a circulation route to enter a conduction state, thereby stopping the spark discharge, the method comprising the steps of:

supplying ignition energy to the ignition plug to cause spark discharge;

stopping the spark discharge by the circulation device and detecting ion current; and determining a combustion state on the basis of the detected ion current, and controlling the combustion state, wherein in the step of detecting the ion current, control is performed such that: the bias voltage is increased by the ion-current-detection bias voltage control device such that a potential of the first electrode becomes a positive voltage; and the bias voltage is decreased by the ion-current-detection bias voltage control device at an end of a period in which the spark discharge is stopped by the circulation device.

19. The method for controlling the internal combustion engine according to claim 18, wherein in the step of detecting the ion current, a decreasing speed of the bias voltage is controlled by the ion-current-detection bias voltage control device such that the potential of the first electrode becomes a constant positive voltage.

* * * * *